(12) United States Patent
Bak et al.

(10) Patent No.: US 12,553,387 B2
(45) Date of Patent: Feb. 17, 2026

(54) GAS TURBINE PLANT WITH AMMONIA DECOMPOSITION SYSTEM

(71) Applicant: DOOSAN ENERBILITY CO., LTD., Changwon-si (KR)

(72) Inventors: Byoung Gu Bak, Suwon-si (KR); Jin Il Kim, Changwon-si (KR); Tae Woo Kim, Yongin-si (KR); Hong Geun Ha, Yongin-si (KR); Young Hoon Bae, Changwon-si (KR); Chil Yeong Seon, Yongin-si (KR); Ki Hyun Lee, Suseong-gu (KR); Kwang Hun Jeong, Gimhae-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/677,659

(22) Filed: May 29, 2024

(65) Prior Publication Data

US 2024/0401520 A1  Dec. 5, 2024

(30) Foreign Application Priority Data

May 30, 2023 (KR) .......................... 10-2023-0069374

(51) Int. Cl.
| | |
|---|---|
| *F02C 7/224* | (2006.01) |
| *C01B 3/047* | (2026.01) |
| *F02C 3/22* | (2006.01) |
| *F02C 6/18* | (2006.01) |
| *F02G 5/04* | (2006.01) |
| *F23R 3/40* | (2006.01) |

(52) U.S. Cl.
CPC .............. *F02C 7/224* (2013.01); *C01B 3/047* (2013.01); *F02C 3/22* (2013.01); *F02C 6/18* (2013.01); *F02G 5/04* (2013.01); *F23R 3/40* (2013.01); *C01B 2203/0277* (2013.01); *F05D 2210/12* (2013.01); *F05D 2220/62* (2013.01); *F05D 2260/20* (2013.01)

(58) Field of Classification Search
CPC .... F23R 3/40; F02C 7/224; F02C 6/18; F02C 3/22; C01B 3/047; C01B 2203/0277; F02G 5/04; F05D 2210/12; F05D 2220/62; F05D 2260/20
See application file for complete search history.

(56) References Cited

U.S. PATENT DOCUMENTS

| | | | |
|---|---|---|---|
| 5,852,925 | A | 12/1998 | Prasad et al. |
| 11,156,168 | B2 | 10/2021 | Nose |
| 11,679,977 | B2 | 6/2023 | Al-Huwaider |

(Continued)

FOREIGN PATENT DOCUMENTS

| | | |
|---|---|---|
| CN | 119222016 A | 12/2024 |
| EP | 4227501 A1 | 8/2023 |

(Continued)

*Primary Examiner* — Kyle Robert Thomas
(74) *Attorney, Agent, or Firm* — Shook, Hardy & Bacon L.L.P.

(57) ABSTRACT

The present disclosure relates to a gas turbine plant which decomposes ammonia and supplies it as fuel to a combustor of the gas turbine. The gas turbine plant supplies sufficient heat to the ammonia in order to thermally decompose the ammonia effectively, and separates the residual ammonia present in the decomposition gas and supplies it to a combustor of the gas turbine.

19 Claims, 22 Drawing Sheets

(56) References Cited

U.S. PATENT DOCUMENTS

| | | |
|---|---|---|
| 11,912,574 B1 | 2/2024 | Jo |
| 11,939,915 B2 | 3/2024 | Uechi |
| 2007/0214766 A1 | 9/2007 | Obana |
| 2018/0355794 A1 | 12/2018 | Bulat |
| 2019/0084831 A1 | 3/2019 | Andersen |
| 2019/0107048 A1 | 4/2019 | Bulat |
| 2020/0032676 A1 | 1/2020 | Nose |
| 2021/0332759 A1* | 10/2021 | Smith ............... F02C 3/04 |
| 2022/0099021 A1* | 3/2022 | Uechi ............... C01B 3/04 |
| 2022/0154646 A1 | 5/2022 | Araki |
| 2022/0162989 A1 | 5/2022 | Cocks |
| 2022/0162999 A1 | 5/2022 | Cocks |
| 2022/0299205 A1 | 9/2022 | MacDonald |
| 2023/0129294 A1 | 4/2023 | Cocks |
| 2023/0313735 A1 | 10/2023 | Smith |
| 2023/0407784 A1 | 12/2023 | Takeishi |
| 2024/0019124 A1 | 1/2024 | Ito |
| 2024/0068416 A1 | 2/2024 | Hagita |
| 2024/0093639 A1 | 3/2024 | Ikeda |
| 2024/0117763 A1 | 4/2024 | Ito |
| 2024/0167417 A1 | 5/2024 | Lin |
| 2024/0183310 A1 | 6/2024 | Uechi |
| 2024/0328358 A1 | 10/2024 | Barth |

FOREIGN PATENT DOCUMENTS

| | | |
|---|---|---|
| JP | 2943851 B2 | 9/1999 |
| JP | 2948341 A | 9/1999 |
| JP | 2016085189 A | 5/2016 |
| JP | 2018076794 A | 5/2018 |
| JP | 2020147478 A | 9/2020 |
| JP | 2020148183 A | 9/2020 |
| KR | 20130071099 A | 6/2013 |
| KR | 20140011773 A | 1/2014 |
| KR | 20210096274 A | 8/2021 |
| KR | 20210121192 A | 10/2021 |
| KR | 20220141943 A | 10/2022 |
| KR | 20230060372 A | 5/2023 |
| WO | 2023162600 A1 | 8/2023 |
| WO | 2024100987 A1 | 5/2024 |

* cited by examiner

GAS TURBINE PLANT WITH AMMONIA DECOMPOSITION SYSTEM

CROSS-REFERENCE TO RELATED APPLICATIONS

The present application claims the benefit of priority to Korea Patent Application No. 10-2023-0069374, filed May 30, 2023, the entire contents of which is incorporated herein for all purposes by this reference.

FIELD

The present disclosure relates to a gas turbine plant with an ammonia decomposition system and more particularly to a gas turbine plant which decomposes ammonia and supplies it as fuel to a combustor of the gas turbine.

BACKGROUND

For the purpose of reducing the emission amount of carbon dioxide in order to preserve global environment, it is a promising option to use hydrogen as a fuel which does not emit carbon dioxide even when combusted. However, compared to a fuel such as liquefied natural gas which is widely used as a fuel for a gas turbine, hydrogen is not easy to transport or store. Therefore, it is being considered that ammonia that can be converted to hydrogen is used as a fuel.

Japanese Patent No. 2948351 discloses a gas turbine plant equipped with a decomposition device that heats ammonia and decomposes it into hydrogen and nitrogen. The decomposition device of the gas turbine plant heats ammonia by performing heat exchange between liquid ammonia with pressure increased by a pressure pump and exhaust gas discharged from the gas turbine, thereby thermally decomposing the ammonia into decomposition gas containing hydrogen and nitrogen. This decomposition gas is supplied as it is to a combustor of the gas turbine.

However, the liquid ammonia may not be sufficiently heated by the exhaust gas. In this case, a large amount of ammonia in addition to hydrogen and nitrogen often remains in the decomposition gas. When the decomposition gas is supplied to the combustor of the gas turbine and the residual ammonia is combusted, there is a problem that a large amount of nitrogen oxides (NOx) is generated.

SUMMARY

The purpose of the present disclosure is to provide a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

The technical problem to be overcome in this document is not limited to the above-mentioned technical problems. Other technical problems not mentioned can be clearly understood from those described below by a person having ordinary skill in the art.

One embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a first superheater configured to superheat gaseous ammonia vaporized by the vaporizer; a decomposition reactor configured to thermally decompose the gaseous ammonia superheated by the first superheater; a separator configured to separate residual ammonia from the decomposition gas decomposed by the decomposition reactor; and a first combustor configured to generate combustion gas in such a way as to supply heat to the decomposition reactor. Synthesis gas consisting of hydrogen and nitrogen with the residual ammonia removed by the separator is supplied to a second combustor of a gas turbine.

The combustion gas may supply heat while passing through the decomposition reactor and the first superheater.

The residual ammonia separated by the separator may be mixed with the gaseous ammonia vaporized by the vaporizer and be supplied to the first superheater.

A portion of the decomposition gas decomposed by the decomposition reactor, a portion of the synthesis gas from which residual ammonia has been removed in the separator, a portion of the liquid ammonia preheated in the preheater, or a portion of the gaseous ammonia superheated by the first superheater may be supplied to the first combustor and combusted.

A portion of exhaust gas discharged from the gas turbine may be supplied to the first combustor.

The decomposition gas may be supplied to the separator after supplying heat through at least one of the preheater, the vaporizer, and the first superheater from the decomposition reactor.

The gas turbine plant may further include a second superheater that pre-superheats the gaseous ammonia before the gaseous ammonia vaporized in the vaporizer is supplied to the first superheater. The decomposition gas may be supplied to the separator after supplying heat through the second superheater from the decomposition reactor.

The gas turbine plant may further include a gas compressor that compresses the decomposition gas or the synthesis gas.

Exhaust gas discharged from the gas turbine may be supplied to a heat recovery steam generator. The combustion gas that has passed through the decomposition reactor and the first superheater may be supplied together with the exhaust gas to the heat recovery steam generator.

Air supplied to a compressor of the gas turbine may supply heat while passing through the preheater before being supplied to the compressor.

A heat transfer fluid may absorb heat from air supplied to a compressor of the gas turbine and may supply the heat to the liquid ammonia in the preheater.

The exhaust gas discharged from the gas turbine or the combustion gas generated in the first combustor may pass through a selective catalytic reduction device. At least one of a portion of the gaseous ammonia vaporized by the vaporizer and a portion of the gaseous ammonia superheated by the first superheater may be supplied as a reducing agent to the selective catalytic reduction device.

The exhaust gas discharged from the gas turbine or the combustion gas generated in the first combustor may pass through a selective catalytic reduction device. The heat transfer fluid may supply heat to the ammonia which is supplied as a reducing agent from the storage tank to the selective catalytic reduction device. The gaseous ammonia vaporized by being supplied with heat by the heat transfer fluid may be supplied together with a portion of the gaseous ammonia superheated by the first superheater to the selective catalytic reduction device.

The exhaust gas discharged from the gas turbine or the combustion gas generated in the first combustor may pass through a selective catalytic reduction device. A portion of the exhaust gas or a portion of the combustion gas may be branched before flowing into the selective catalytic reduction device, and may supply heat the ammonia supplied as a reducing agent to the selective catalytic reduction device.

The gas turbine plant may further include a fuel heater that heats the fuel supplied to the first combustor or the synthesis gas supplied to the second combustor. Exhaust gas discharged from the gas turbine is supplied to a heat recovery steam generator. The combustion gas or water or steam heated by heat of the exhaust gas in the heat recovery steam generator may be supplied as a heat source to the fuel heater.

Exhaust gas discharged from the gas turbine may be supplied to a heat recovery steam generator. Steam generated by heat of the exhaust gas in the heat recovery steam generator may be supplied to a steam turbine, may drive the steam turbine, and then may flow into a condenser. Water condensed in the condenser may exchange heat with the combustion gas, and then may be supplied back to the heat recovery steam generator.

Exhaust gas discharged from the gas turbine may be supplied to a heat recovery steam generator. Water or steam heated by heat of the exhaust gas in the heat recovery steam generator may supply heat while passing through at least one of the preheater, the vaporizer, and the first superheater, and then may return back to the heat recovery steam generator.

The gas turbine plant may further include a second superheater that pre-superheats the gaseous ammonia before the gaseous ammonia vaporized in the vaporizer is supplied to the first superheater. Exhaust gas discharged from the gas turbine may be supplied to a heat recovery steam generator. Water or steam heated by heat of the exhaust gas in the heat recovery steam generator may supply heat while passing through the second superheater, and then may return back to the heat recovery steam generator.

Natural gas may be further supplied to the second combustor. The gas turbine plant may further include: a natural gas heater that heats the natural gas supplied to the second combustor; and a fuel heater that heats the synthesis gas supplied to the second combustor. A temperature of the synthesis gas heated in the fuel heater may be lower than a temperature of the natural gas heated in the natural gas heater.

Another embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a first superheater configured to superheat gaseous ammonia vaporized by the vaporizer; a decomposition reactor configured to thermally decompose the gaseous ammonia superheated by the first superheater; a separator configured to separate residual ammonia from the decomposition gas decomposed by the decomposition reactor; and a first combustor configured to generate combustion gas in such a way as to supply heat to the decomposition reactor. A portion of the decomposition gas decomposed in the decomposition reactor is supplied to a second combustor of a gas turbine. Synthesis gas consisting of hydrogen and nitrogen with the residual ammonia removed by the separator is supplied to the first combustor and combusted.

According to the embodiment of the present disclosure, the ammonia decomposition system may include the preheater, the vaporizer, and the superheater, which are for heating the ammonia before the decomposition reactor, and the combustion gas generated by the separate first combustor supplies heat to the decomposition reactor. Accordingly, sufficient heat can be supplied to the ammonia and the ammonia can be thermally decomposed effectively at a high temperature.

A portion of the ammonia, the decomposition gas or the synthesis gas present in the ammonia decomposition system is supplied to the first combustor as a fuel, so that separate fuel such as fossil fuel, etc., is not required.

Also, the decomposition gas, air supplied to the compressor of the gas turbine, or water or steam heated in the heat recovery steam generator are used as a heat source for supplying heat to some components (preheater, vaporizer, etc.) of the ammonia decomposition system, so that the efficiency of the plant can be increased.

Also, the ammonia present in the ammonia decomposition system is directly supplied as a reducing agent to the selective catalytic reduction device, or alternatively, the air supplied to the compressor of the gas turbine, the exhaust gas, or the combustion gas is used as a heat source to vaporize the ammonia supplied as a reducing agent to the selective catalytic reduction device. Accordingly, configuration and cost for supplying the reducing agent can be reduced.

Also, the fuel (synthesis gas) entering the first combustor or the second combustor is heated, so that the amount of fuel used for a target temperature of the combustion gas can be reduced.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
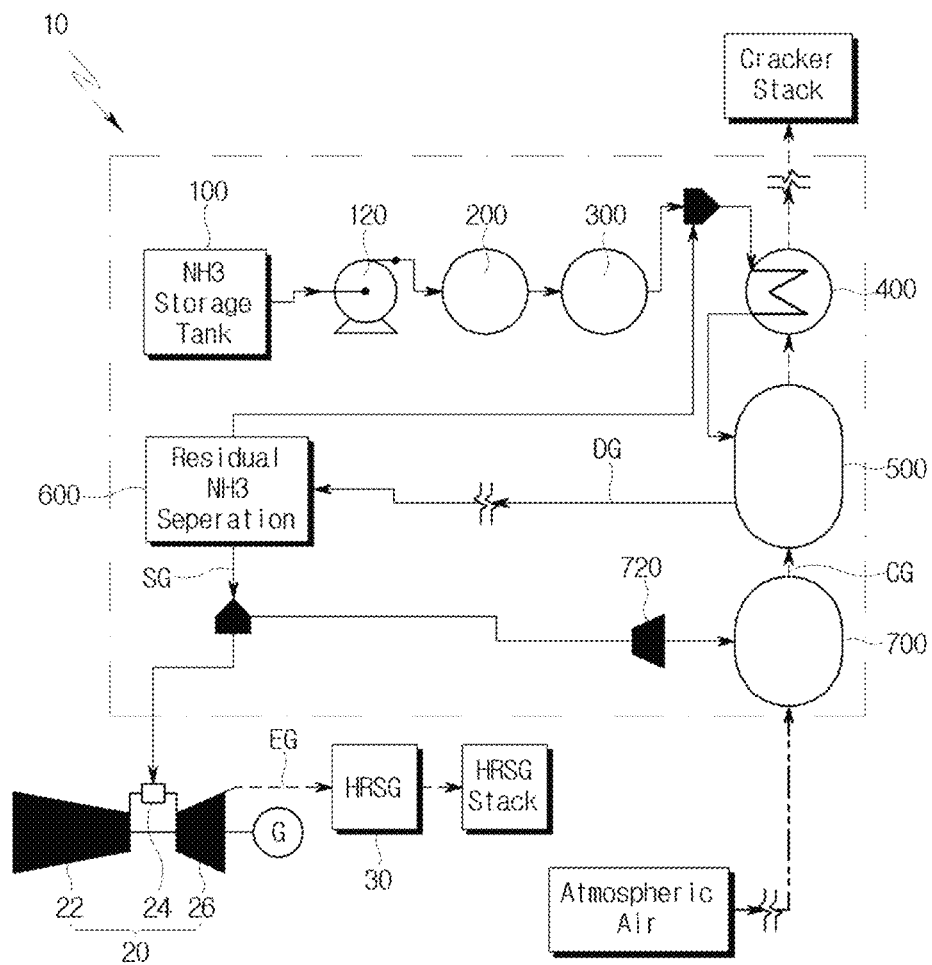
FIG. 1 is a schematic diagram of a gas turbine plant with an ammonia decomposition system according to an embodiment described herein.

Hereinafter, preferable embodiments of a gas turbine plant with an ammonia decomposition system will be described with reference to accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless there is a special opposite mention.

First, a gas turbine plant including an ammonia decomposition system according to an embodiment of the present disclosure will be described with reference to FIG. 1.

The gas turbine plant according to the embodiment generally includes an ammonia decomposition system 10, a gas turbine 20, and a heat recovery steam generator (HRSG) 30.

The ammonia decomposition system 10 includes a storage tank 100, a supply pump 120, a preheater 200, a vaporizer 300, a first superheater 400, a decomposition reactor 500, a separator 600, and a first combustor 700.

The gas turbine 20 includes a compressor 22 for compressing air to high pressure, a second combustor 24 for mixing the air compressed by the compressor 22 with fuel and for combusting, and a turbine 26 for generating power while rotating turbine blades by using high-temperature and high-pressure combustion gas discharged from the second combustor 24.

In the embodiment of the present disclosure, synthesis gas based on hydrogen decomposed in the ammonia decomposition system 10 as a main component is supplied as fuel for the second combustor 24. While the figure shows that only the synthesis gas is supplied, in other aspects, it is also possible that the synthesis gas and natural gas are supplied to the second combustor 24 together and mixed and combusted.

Exhaust gas (EG) discharged from the turbine 26 of the gas turbine 20 is supplied to the heat recovery steam generator 30 and vaporizes water into steam within the heat recovery steam generator 30. The steam generated in the heat recovery steam generator 30 is supplied to a steam turbine (not shown) and produces electric power.

Hereinafter, each component of the ammonia decomposition system 10 will be described in detail. FIG. 1 shows a flow of ammonia or ammonia-decomposed gas passing through the components of the ammonia decomposition system 10, and adjacent components will be connected to each other through connection pipes, etc.

The storage tank 100 stores liquid ammonia, and the supply pump 120 increases the pressure of the liquid ammonia of the storage tank 100 and supplies the liquid ammonia to the preheater 200.

Subsequently, the preheater 200, the vaporizer 300, and the first superheater 400 are configured to vaporize and heat the liquid ammonia prior to the decomposition reactor 500. Specifically, the preheater 200 preheats the liquid ammonia supplied by the supply pump 120. The vaporizer 300 vaporizes the liquid ammonia preheated by the preheater 200. The first superheater 400 superheats gaseous ammonia vaporized by the vaporizer 300.

As one example, when the supply pump 120 increases the pressure of the liquid ammonia to 40 atm, the boiling point of the ammonia at 40 atm is around 100° C. In this case, the preheater 200 heats the liquid ammonia to below the boiling point, and the vaporizer 300 heats the liquid ammonia to the boiling point and generates gaseous ammonia. The first superheater 400 additionally heats the gaseous ammonia.

The decomposition reactor 500 thermally decomposes the gaseous ammonia superheated by the first superheater 400 and generates decomposition gas (DG) containing hydrogen, nitrogen, and residual ammonia. A catalyst that promotes the thermal decomposition of the ammonia may be filled in the decomposition reactor 500. The catalyst has a catalyst component that activates a decomposition reaction, and a carrier that supports the catalyst component. An example of the catalyst component includes particles of precious metal such as Ru, etc., and metal particles including transition metals such as Ni, Co, and Fe, etc. The carrier includes a metal oxide such as Al2O3, ZrO2, Pr2O3, La2O3, MgO, etc. The catalyst is not limited to the catalysts exemplified above as long as the catalyst activates the decomposition reaction of ammonia.

Here, a reaction temperature for the thermal decomposition of the ammonia (depending on the catalyst, generally 400° C. to 700° C.) is much higher than a boiling point of ammonia. Therefore, the first superheater 400 and the decomposition reactor 500 requires a higher temperature heat source than the preheater 200 and the vaporizer 300.

To this end, the ammonia decomposition system 10 includes the first combustor 700 that generates combustion gas (CG) such that heat is supplied to the decomposition reactor 500. In the embodiment, the combustion gas (CG) generated by the first combustor 700 supplies heat while passing through the decomposition reactor 500 and the first superheater 400. However, the embodiment is not limited to this, and the combustion gas (CG) may additionally pass through the preheater 200 or the vaporizer 300.

The exhaust gas (EG) discharged from the gas turbine 20 generally has a temperature of about 600° C., and the combustion gas (CG) generated by the first combustor 700 generally has a temperature of about 1000° C. Therefore, when the combustion gas (CG) is used, with the inclusion of the separate first combustor 700, as a heat source of the decomposition reactor 500 without using the exhaust gas (EG), the ammonia can be effectively thermally decomposed by the decomposition reactor 500 even without using a high-performance catalyst, and the efficiency of the decomposition reactor 500 can be improved.

The separator 600 separates the residual ammonia from the decomposition gas (DG) decomposed by the decomposition reactor 500. Then, the residual ammonia is removed in the separator 600 and the synthesis gas (SG), which may consist of hydrogen and nitrogen, is supplied to the second combustor 24 of the gas turbine. Here, the residual ammonia separated by the separator 600 may be mixed with the gaseous ammonia vaporized by the vaporizer 300 and may be supplied to the first superheater 400. Since ammonia is highly soluble in water, the separator 600 can remove the residual ammonia by dissolving the residual ammonia in water. Also, ammonia is easier to evaporate than water. Therefore, when ammonia water that is obtained by dissolving the residual ammonia in water is heated, gaseous ammonia can be separated again.

As such, the ammonia decomposition system 10 may include the preheater 200, the vaporizer 300, and the first superheater 400, which are for heating the ammonia before the decomposition reactor 500, and the combustion gas (CG) generated by the separate first combustor 700 supplies heat to the decomposition reactor 500. Accordingly, sufficient heat can be supplied to the ammonia and the ammonia can be thermally decomposed effectively.

Accordingly, there is not much residual ammonia in the decomposition gas (DG), and the residual ammonia is reliably removed through the separator 600 and the synthesis gas (SG) is supplied to the second combustor 24, thereby reducing nitrogen oxides in the exhaust gas (EG).

Separate fuel such as fossil fuel may be supplied to the first combustor 700. However, it is desirable that a portion of the ammonia, the decomposition gas (DG) or the synthesis gas (SG) present in the ammonia decomposition system 10 should be supplied as fuel to the first combustor 700 in order that the system is simplified and carbon dioxide is not emitted.

In the embodiment, a portion of the synthesis gas (SG) from which residual ammonia has been removed in the separator 600 is supplied to the first combustor 700 and combusted. Air may be supplied to the first combustor 700 in order to supply an oxidant (oxygen). In this way, a portion of the synthesis gas (SG) is supplied as fuel to the first combustor 700, so that no separate fuel such as fossil fuel is required.

Figure 5:
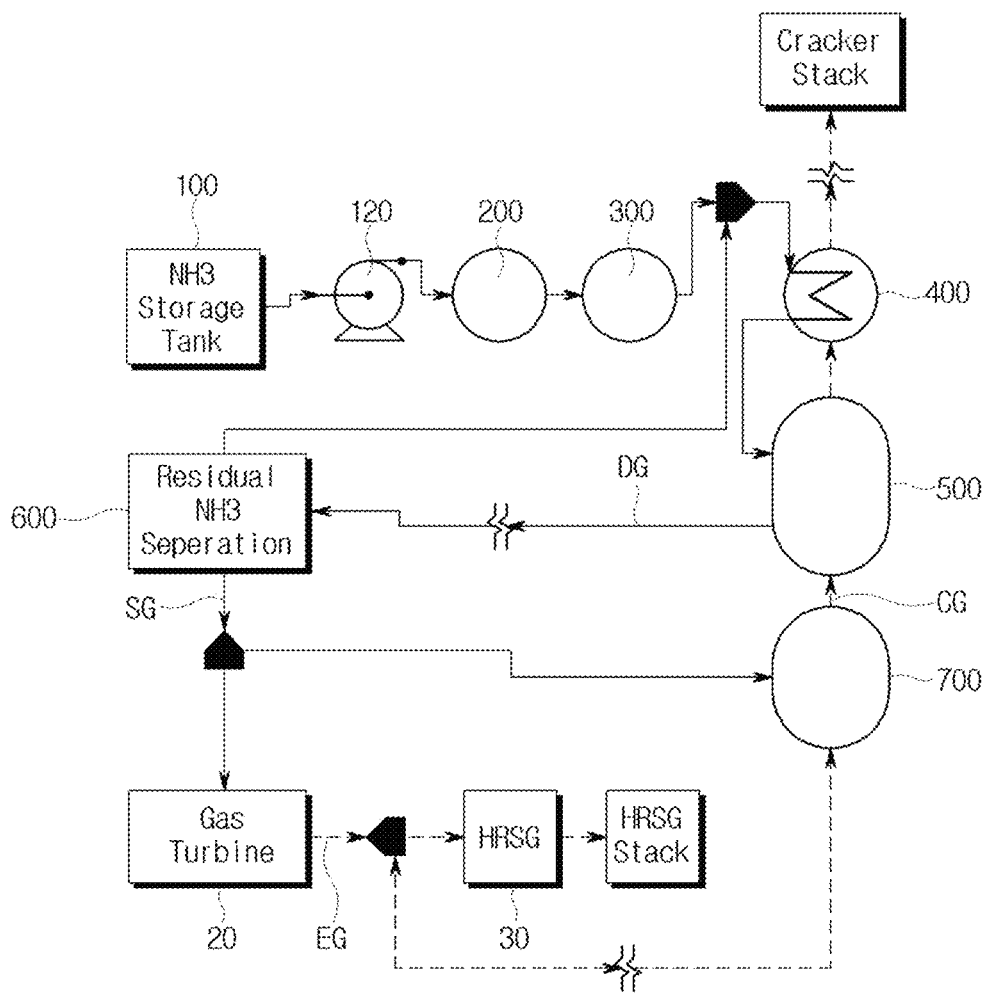
FIG. 5 is a schematic diagram of a gas turbine plant with an ammonia decomposition system according to an embodiment described herein.

Here, a portion of the synthesis gas (SG) may be expanded by a gas expander 720 before being supplied to the first combustor 700. Energy can be recovered from high-temperature and high-pressure synthesis gas (SG) by the gas expander 720. As shown in FIG. 5, the gas expander 720 may be omitted depending on the embodiment.

Figure 2:
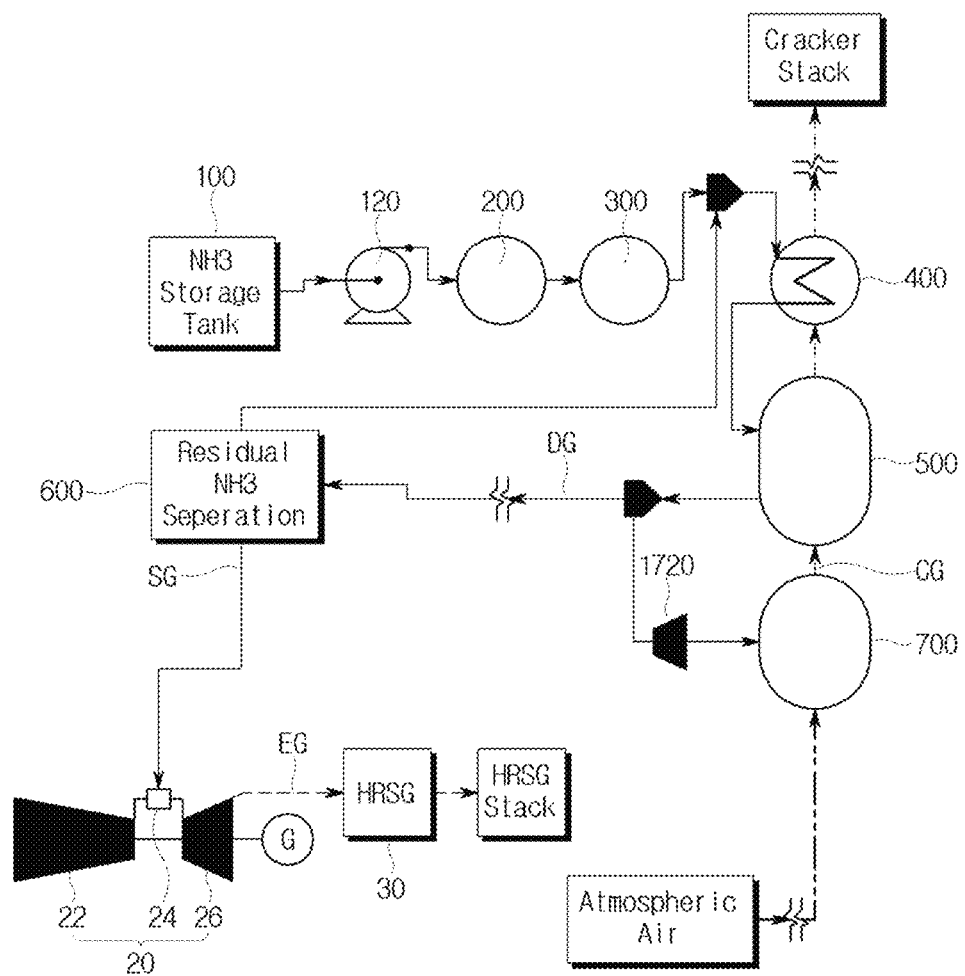
FIG. 2 is a schematic diagram of a gas turbine plant with an ammonia decomposition system according to an embodiment described herein.

However, the embodiment is not limited to this. As shown in FIG. 2, a portion of the decomposition gas (DG) decomposed by the decomposition reactor 500 may be supplied to the first combustor 700 and combusted. Likewise, a portion of the decomposition gas (DG) may be expanded by a gas expander 1720 before being supplied to the first combustor 700.

Figure 3:
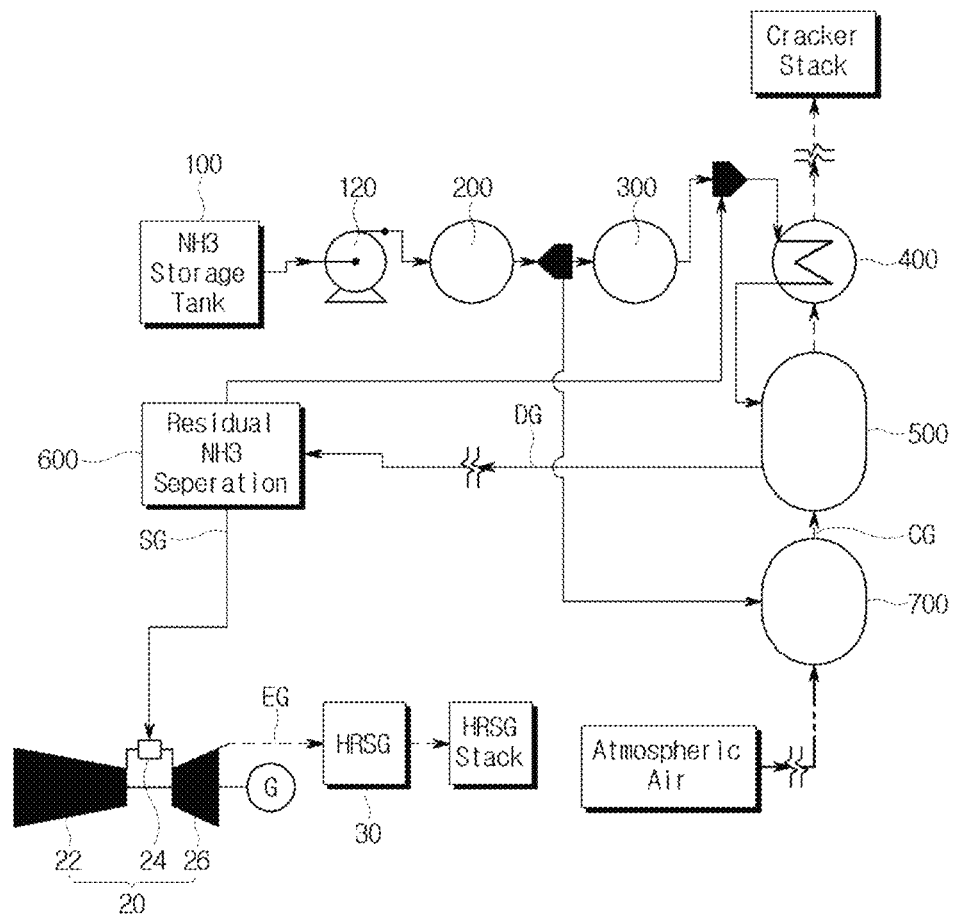
FIG. 3 is a schematic diagram of a gas turbine plant with an ammonia decomposition system according to an embodiment described herein.
Figure 4:
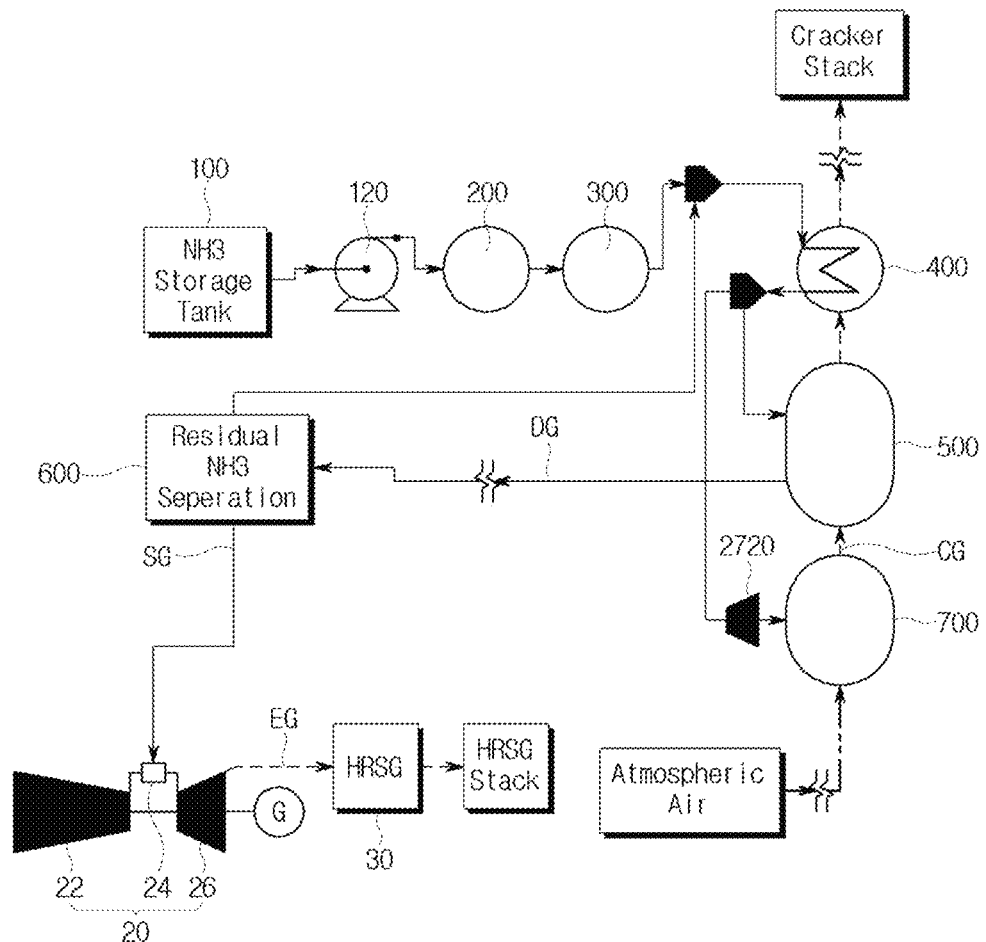
FIG. 4 is a schematic diagram of a gas turbine plant with an ammonia decomposition system according to an embodiment described herein.

Also, as shown in FIGS. 3 and 4, the ammonia present in the ammonia decomposition system 10 may be supplied to the first combustor 700 and combusted.

Specifically, in FIG. 3, a portion of the liquid ammonia preheated in the preheater 200 is supplied to the first combustor 700 and combusted. According to this, since the liquid ammonia takes away residual heat while vaporizing within the first combustor 700, a combustion temperature is lowered as much as the residual heat, which can help suppress a nitrogen oxide production reaction.

In FIG. 4, a portion of the gaseous ammonia superheated by the first superheater 400 is supplied to the first combustor 700 and combusted. According to this, since the gaseous ammonia having the highest temperature in the ammonia decomposition system 10 is supplied, efficiency can be improved. A portion of the gaseous ammonia superheated in the first superheater 400 may be expanded by a gas expander 2720 before being supplied to the first combustor 700.

The following embodiments will focus on differences from the embodiment shown in FIG. 1.

According to the embodiment shown in FIG. 5, a portion of the exhaust gas (EG) discharged from the gas turbine 20 is supplied to the first combustor 700. Since a large amount of residual oxygen exists in the exhaust gas (EG), the exhaust gas (EG) can be supplied as an oxidant instead of the air. In this case, the efficiency can be improved because the temperature of the exhaust gas (EG) is higher than that of the air. However, it is also possible that the air is additionally supplied together with the exhaust gas (EG) if necessary.

Figure 6:
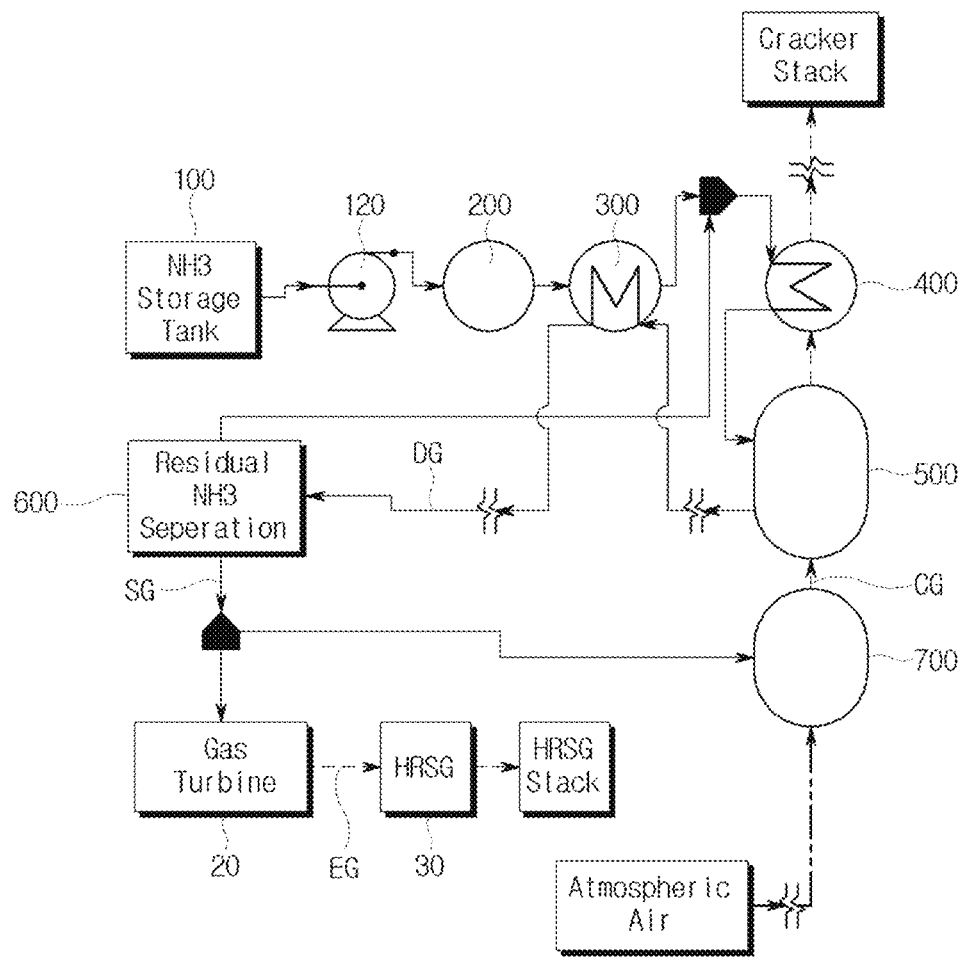
FIG. 6 is a schematic diagram of a gas turbine plant with an ammonia decomposition system according to an embodiment described herein.

Next, according to the embodiment shown in FIG. 6, the decomposition gas (DG) is not directly supplied from the decomposition reactor 500 to the separator 600, but is supplied to the separator 600 after supplying heat through the vaporizer 300 from the decomposition reactor 500. In this way, the efficiency of the plant can be increased by using the decomposition gas (DG) as a heat source of the vaporizer 300. Although not shown, it is possible that the decomposition gas (DG) can supply heat while passing through the preheater 200 or the first superheater 400. In some cases, the decomposition gas (DG) may supply heat while continuously passing through two or more of the preheater 200, the vaporizer 300, and the first superheater 400. If the decomposition gas (DG) passes through the first superheater 400, the combustion gas (CG) may not pass through the first superheater 400.

Figure 7:
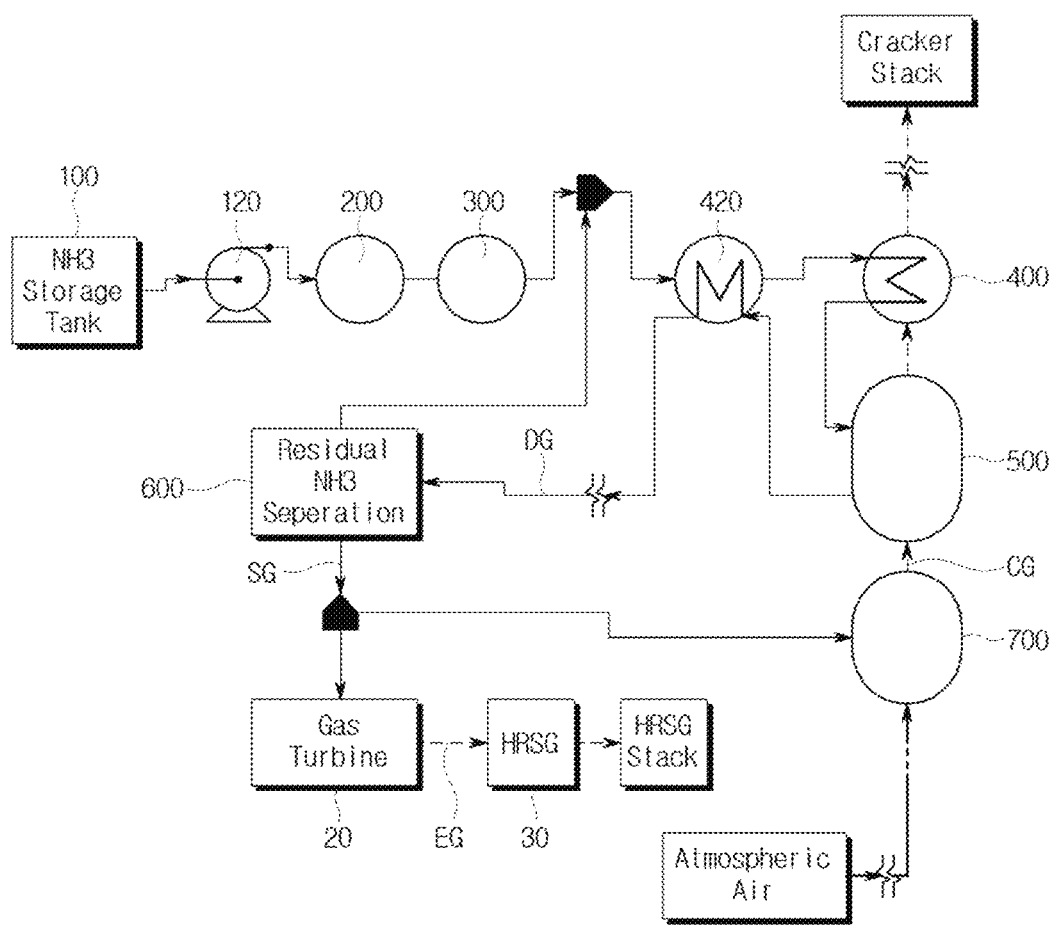
FIG. 7 is a schematic diagram of a gas turbine plant with an ammonia decomposition system according to an embodiment described herein.

According to the embodiment shown in FIG. 7, the ammonia decomposition system 10 further includes a second superheater 420 that pre-superheats the gaseous ammonia before the gaseous ammonia vaporized in the vaporizer 300 is supplied to the first superheater 400. Also, the decomposition gas (DG) is not directly supplied from the decomposition reactor 500 to the separator 600, but is supplied to the separator 600 after supplying heat through the second superheater 420 from the decomposition reactor 500. In this way, the decomposition gas (DG) is used as a heat source of the second superheater 420, so that sufficient heat can be supplied to the ammonia and the efficiency of the plant can be increased.

Figure 8:
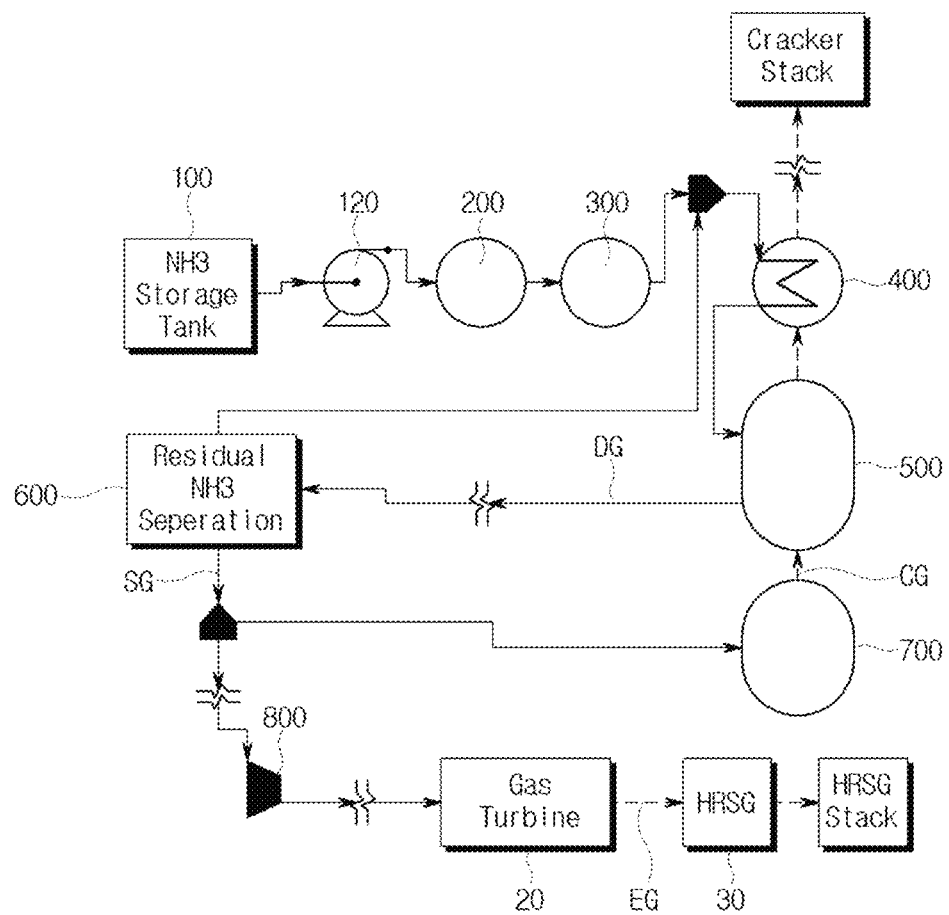
FIG. 8 is a schematic diagram of a gas turbine plant with an ammonia decomposition system according to an embodiment described herein.
Figure 9:
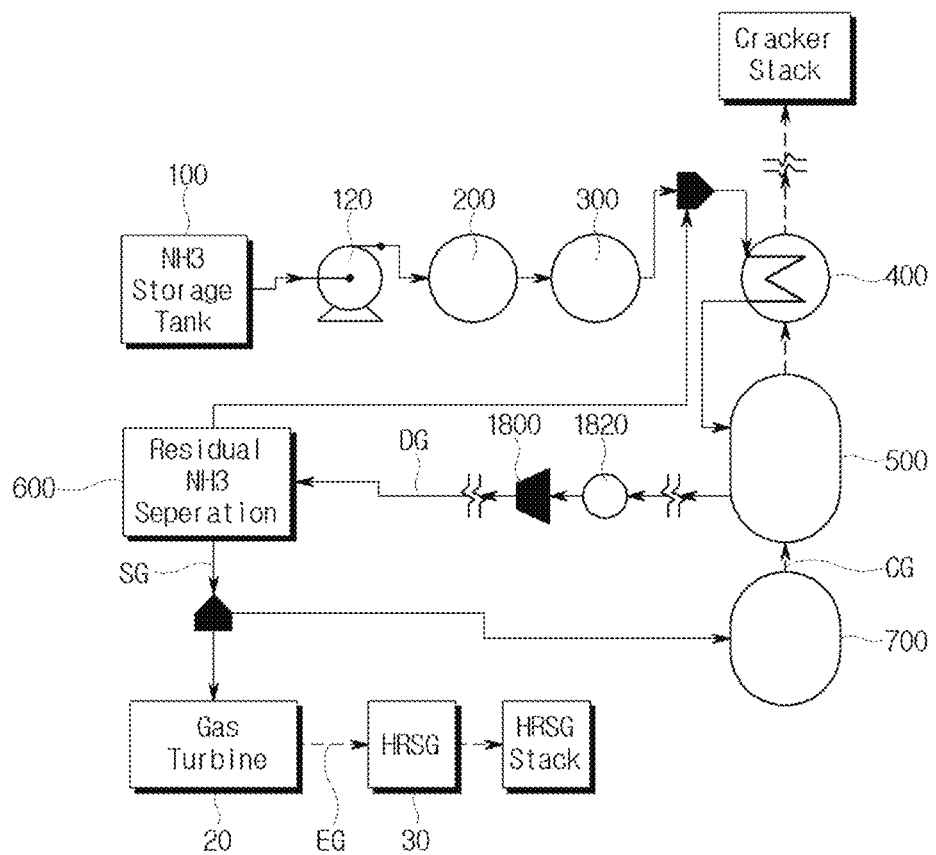
FIG. 9 is a schematic diagram of a gas turbine plant with an ammonia decomposition system according to an embodiment described herein.

Next, according to the embodiment shown in FIGS. 8 and 9, the ammonia decomposition system 10 further includes a gas compressor. In this case, the supply pump 120 increases the pressure of the liquid ammonia to a lower air pressure than that in a case without the gas compressor. Accordingly, the ammonia at a very high air pressure is not supplied to the decomposition reactor 500, and thus, reactivity can be improved.

FIG. 8 shows the gas compressor 800 that compresses the synthesis gas (SG). When the synthesis gas (SG) is discharged from the separator 600 and is then branched and supplied to the first combustor 700 and the second combustor 24, respectively, it is desirable that the gas compressor 800 should be provided to compress the synthesis gas (SG) supplied to the second combustor 24. Since the second combustor 24 of the gas turbine requires fuel at a high pressure of approximately 25 bar, the gas compressor 800 can compress the synthesis gas (SG) to approximately 25 bar. Here, although not shown, a cooler may be provided upstream or downstream of the gas compressor 800.

Also, FIG. 9 shows a gas compressor 1800 that compresses the decomposition gas (DG). The gas compressor 1800 compresses the decomposition gas (DG) entering the separator 600, so that high-pressure fuel can be supplied to both the first combustor 700 and the second combustor 24. Here, a cooler 1820 may be provided upstream or downstream of the gas compressor 1800. When the cooler 1820 is provided upstream of the gas compressor 1800, the power consumption of the gas compressor can be reduced. When the cooler is provided downstream of the gas compressor 1800, the temperature of the gas whose temperature increases as it passes through the gas compressor can be reduced. While FIG. 9 shows that the cooler 1820 is provided upstream of the gas compressor 1800, but the cooler 1820 is not limited to this. The cooler 1820 may be provided downstream of the gas compressor 1800 or may be provided both upstream and downstream of the gas compressor 1800.

Figure 10:
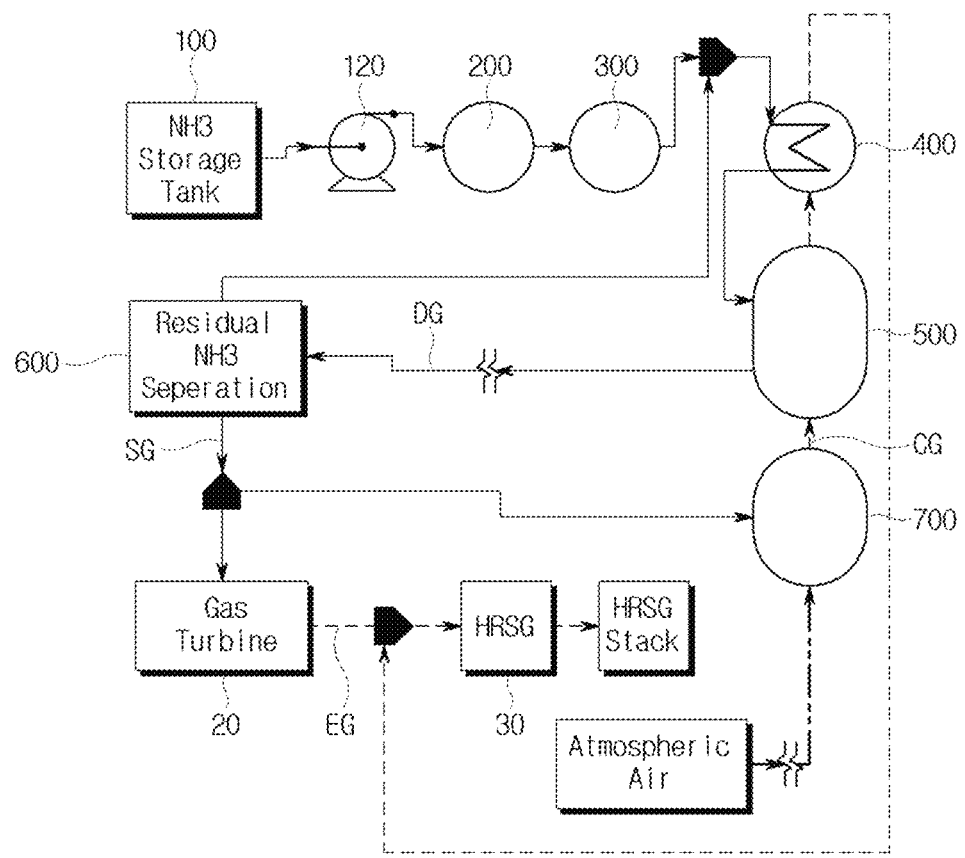
FIG. 10 is a schematic diagram of a gas turbine plant with an ammonia decomposition system according to an embodiment described herein.

Next, according to the embodiment shown in FIG. 10, the combustion gas (CG) that has passed through the decomposition reactor 500 and the first superheater 400 is supplied together with the exhaust gas (EG) to the heat recovery steam generator 30. The combustion gas (CG) may be mixed with the exhaust gas (EG) upstream of the heat recovery steam generator 30 and may be simultaneously supplied to the inlet of the heat recovery steam generator 30, or may be supplied separately in the middle of the heat recovery steam generator 30 and may be mixed with the exhaust gas (EG) within the heat recovery steam generator 30. As a result, the combustion gas (CG) together with the exhaust gas (EG) can vaporize water into steam in the heat recovery steam generator 30 and increase the efficiency of the plant.

Figure 11:
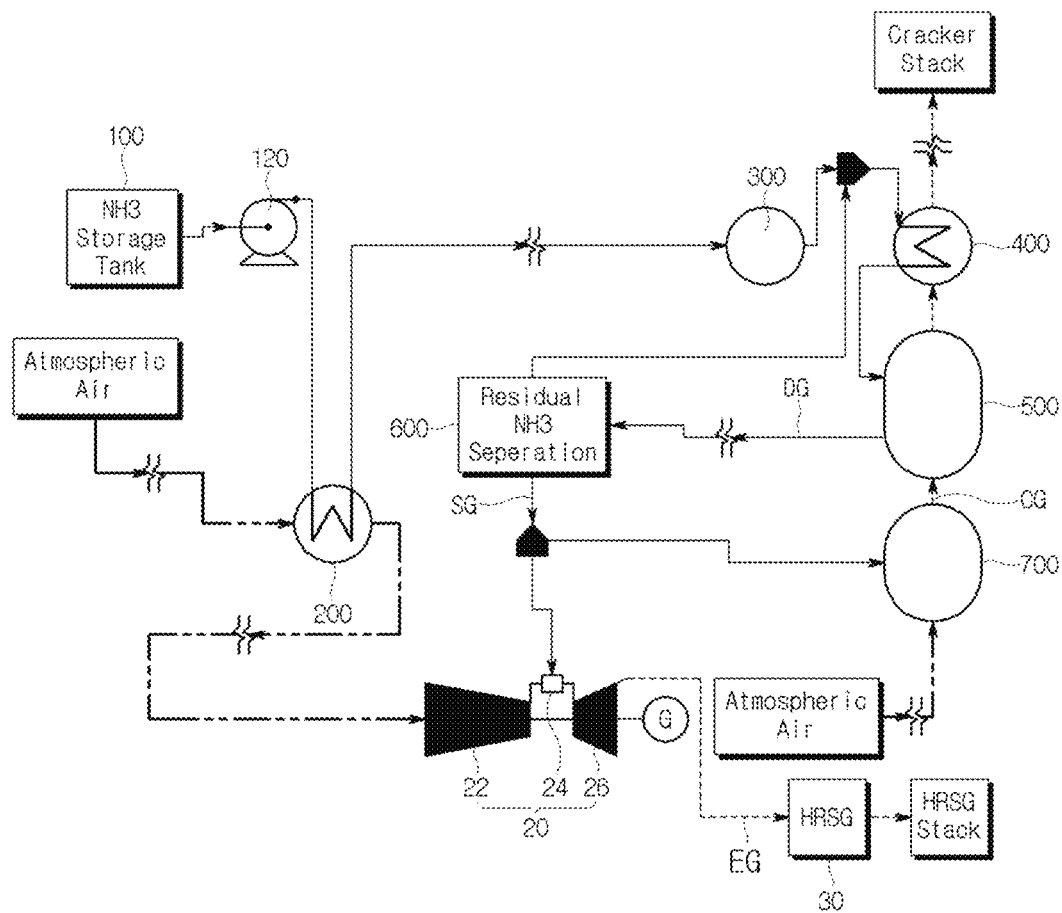
FIG. 11 is a schematic diagram of a gas turbine plant with an ammonia decomposition system according to an embodiment described herein.
Figure 12:
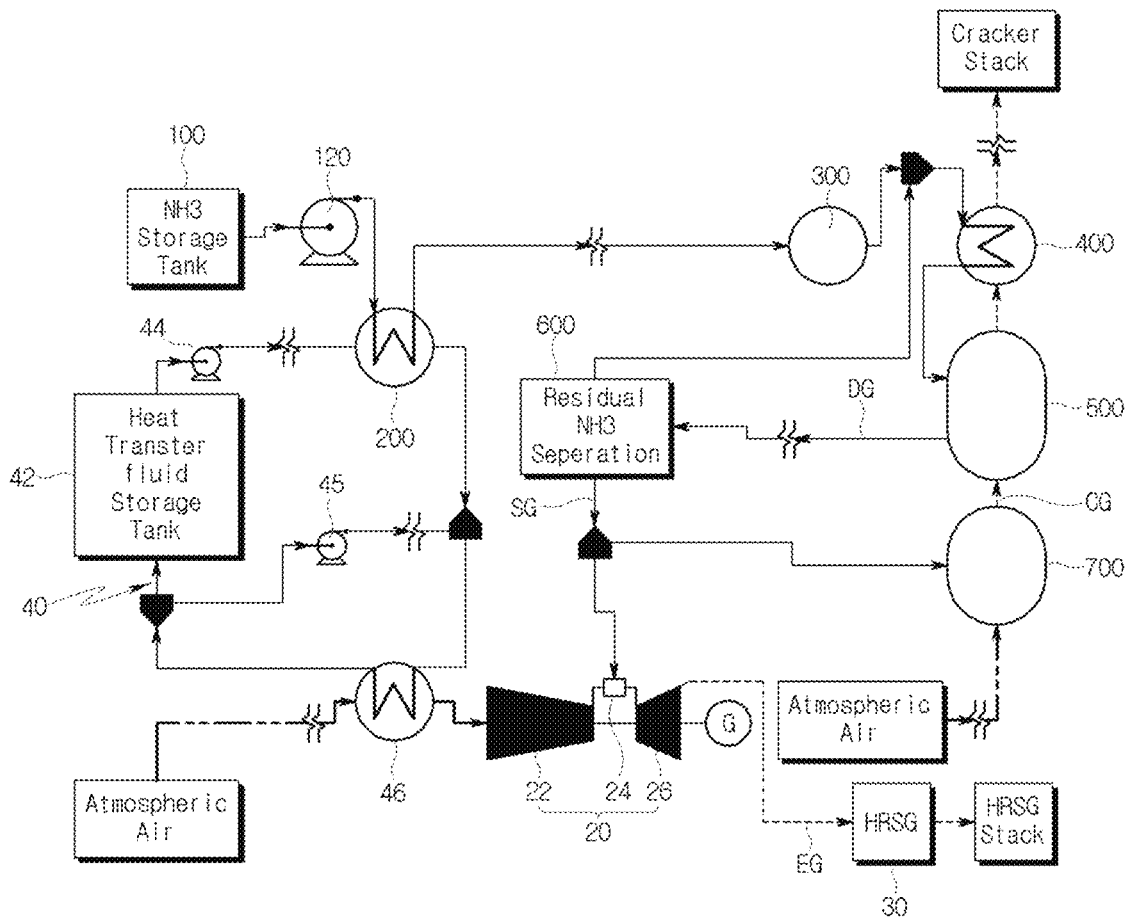
FIG. 12 is a schematic diagram of a gas turbine plant with an ammonia decomposition system according to an embodiment described herein.

Next, according to the embodiment shown in FIGS. 11 and 12, the air supplied to the compressor 22 of the gas turbine exchanges heat directly or indirectly with the liquid ammonia.

Specifically, in FIG. 11, the air supplied to the compressor 22 of the gas turbine supplies heat while passing through the preheater 200 before being supplied to the compressor 22. That is, the air supplied to the compressor 22 and the liquid ammonia within the preheater 200 directly exchange heat. In the embodiment, since the air is supplied to the compressor 22, air at room temperature is cooled through the preheater 200 and supplied to the compressor 22. In this way, by preheating the liquid ammonia within the preheater 200 by using the air supplied to the compressor 22, the output of the compressor 22 can be improved and the efficiency of the plant can be increased.

In FIG. 12, a heat transfer fluid absorbs heat from the air supplied to the compressor 22 of the gas turbine and supplies the heat to the liquid ammonia in the preheater 200. That is, the air supplied to the compressor 22 and the liquid ammonia within the preheater 200 exchange heat indirectly by the heat transfer fluid. The heat transfer fluid must be a liquid that does not freeze even at the temperature of the liquid ammonia. For example, the heat transfer fluid may be antifreeze.

Specifically, a heat transfer fluid circuit 40 in which the heat transfer fluid circulates may include a storage tank 42 where the heat transfer fluid is stored, a pump 44, the preheater 200, and a first heat exchanger 46, and they are connected in series. The heat transfer fluid may be heated while exchanging heat with the air at room temperature in the first heat exchanger 46, and may be cooled while exchanging heat with the liquid ammonia in the preheater 200. Here, the heat transfer fluid may fall below zero temperature while exchanging heat with the liquid ammonia in the preheater 200, and when the sub-zero heat transfer fluid is supplied to the first heat exchanger 46 and exchanges heat with the air at room temperature, water vapor contained in the atmosphere sublimates and freezes, and particles may be produced. Accordingly, for the purpose of preventing this, the heat transfer fluid circuit 40 may further include an additional pump 45 in a line disposed in parallel with the pump 44 and the preheater 200. In this case, a portion of the heat transfer fluid that has come from the first heat exchanger 46 is branched, and bypassed without passing through the preheater 200, and then joins the heat transfer fluid that has passed through the preheater 200, so that the above-zero heat transfer fluid can be supplied to the first heat exchanger 46.

Alternatively, although not shown in FIG. 12, the first heat exchanger 46 may be replaced with an injection unit and a portion of the heat transfer fluid may be partially sprayed onto the room temperature air without the heat exchange between the heat transfer fluid and the room temperature air. In this case, the heat transfer fluid may be additionally replenished in the storage tank 42 as much as the amount of the sprayed heat transfer fluid.

Figure 13:
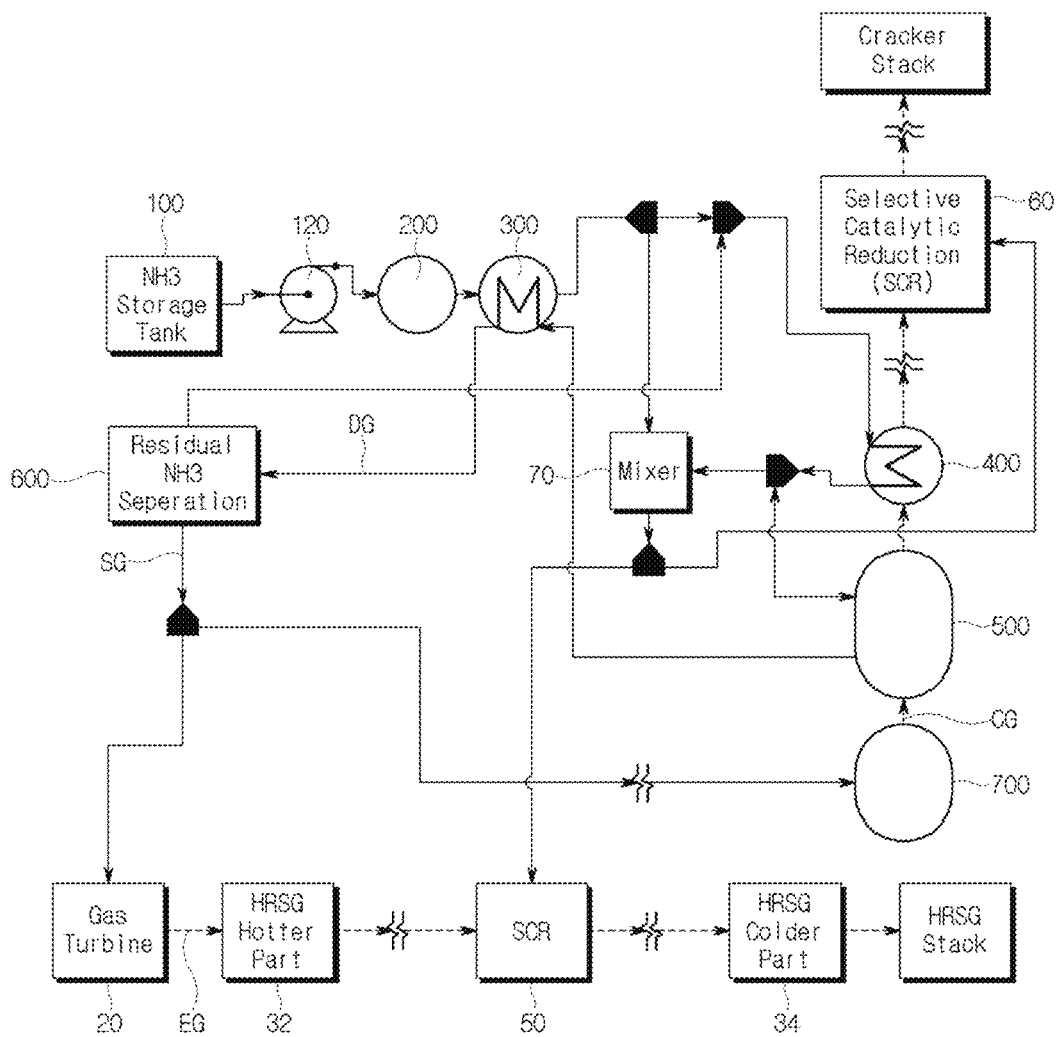
FIG. 13 is a schematic diagram of a gas turbine plant with an ammonia decomposition system according to an embodiment described herein.
Figure 14:
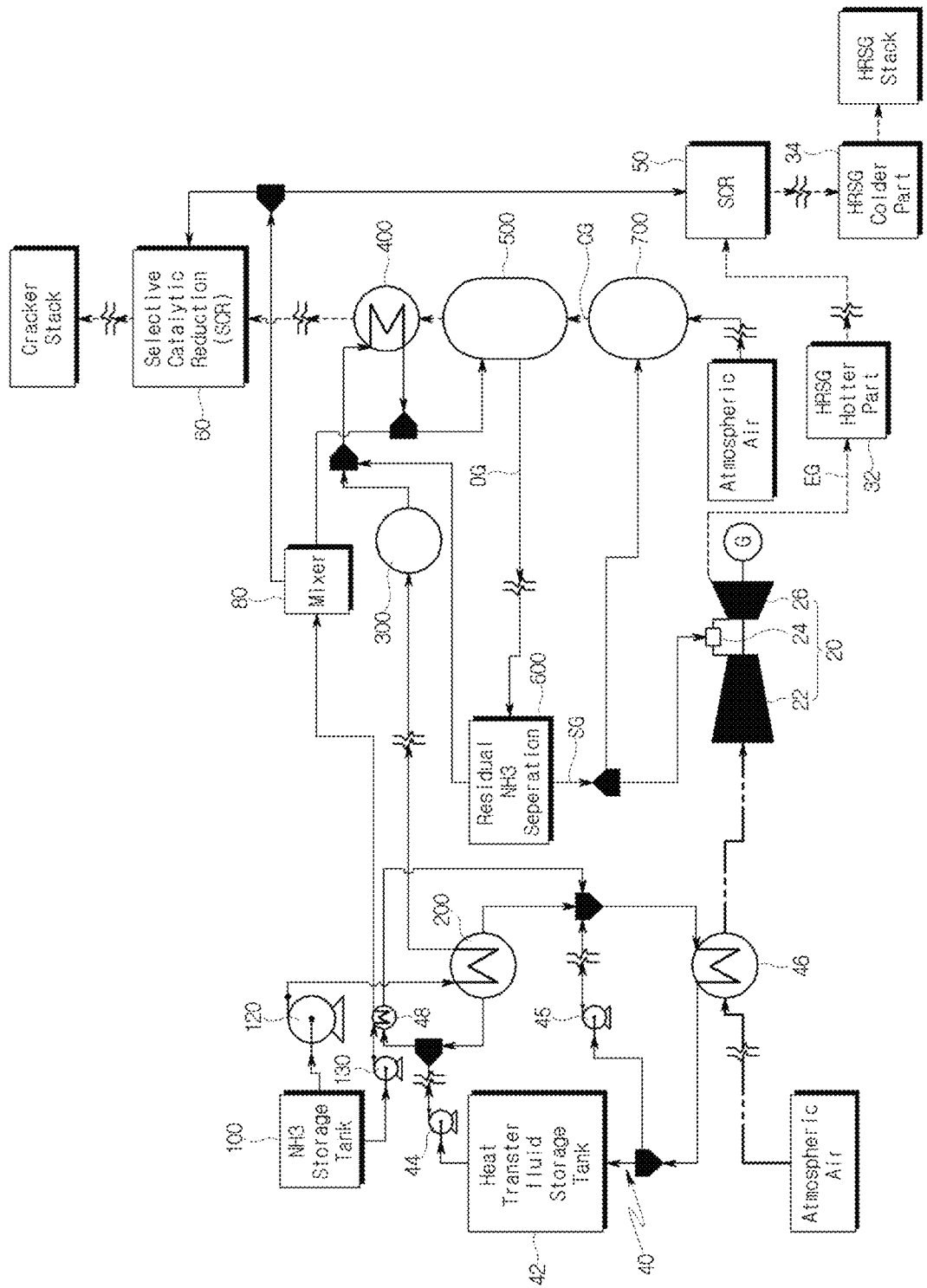
FIG. 14 is a schematic diagram of a gas turbine plant with an ammonia decomposition system according to an embodiment described herein.
Figure 15:
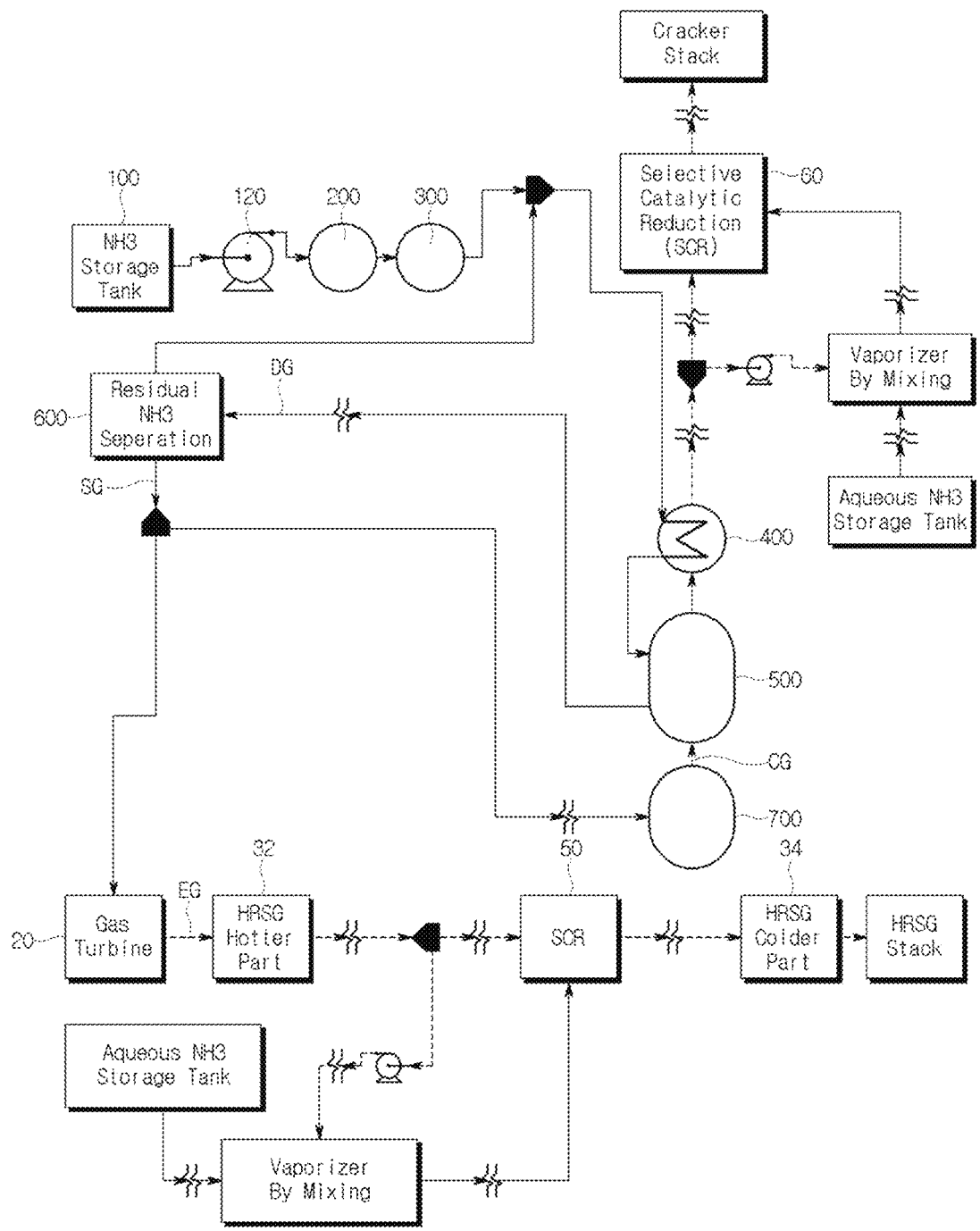
FIG. 15 is a schematic diagram of a gas turbine plant with an ammonia decomposition system according to an embodiment described herein.

Next, according to the embodiment shown in FIGS. 13 to 15, the exhaust gas (EG) discharged from the gas turbine 20 or the combustion gas (CG) generated in the first combustor 700 passes through a selective catalytic reduction device in order to reduce nitrogen oxides.

The exhaust gas (EG) passes through a first selective catalytic reduction device 50, and the combustion gas (CG) passes through a second selective catalytic reduction device 60. In particular, the exhaust gas (EG) may pass through a high temperature portion 32 of the heat recovery steam generator 30, then may pass through the first selective catalytic reduction device 50, and then may pass through a low temperature portion 34 of the heat recovery steam generator 30.

In FIG. 13, at least one of a portion of the gaseous ammonia vaporized by the vaporizer 300 and a portion of the gaseous ammonia superheated by the first superheater 400 is supplied as a reducing agent to the first and second selective catalytic reduction devices 50 and 60. For this purpose, a mixer 70 may be additionally provided to mix a portion of the gaseous ammonia vaporized by the vaporizer 300 and a portion of the gaseous ammonia superheated by the first superheater 400.

In this way, the ammonia present in the ammonia decomposition system 10 is directly supplied as a reducing agent to the selective catalytic reduction devices 50 and 60, thereby reducing the configuration and cost for supplying the reducing agent.

In FIG. 14, the heat transfer fluid circuit 40 as described in FIG. 12 is included in the same manner, and a second heat exchange unit 48 may be further included in a line arranged in parallel with the preheater 200. The second heat exchange unit 48 exchanges heat with the liquid ammonia supplied through an additional supply pump 130 from the storage tank 100. The gaseous ammonia vaporized by the second heat exchanger 48 by being supplied with heat by the heat transfer fluid may be supplied together with a portion of the gaseous ammonia superheated by the first superheater 400 as a reducing agent to the first and second selective catalytic reduction devices 50 and 60. For this purpose, a mixer 80 may be additionally provided to mix the gaseous ammonia vaporized by the second heat exchanger 48 and a portion of the gaseous ammonia superheated by the first superheater 400.

As such, the ammonia present in the ammonia decomposition system 10 is supplied as a reducing agent to the selective catalytic reduction devices 50 and 60, and the air supplied to the compressor 22 of the gas turbine is used as a heat source for vaporizing the ammonia, so that the configuration and cost for supplying the reducing agent can be reduced.

In FIG. 15, a portion of the exhaust gas (EG) and a portion of the combustion gas (CG) are branched before flowing into the first and second selective catalytic reduction devices 50 and 60, respectively, and supply heat to the ammonia supplied as a reducing agent to the selective catalytic reduction device. In other words, the exhaust gas and the combustion gas are used as a heat source to vaporize the ammonia supplied as a reducing agent to the selective catalytic reduction device. While FIG. 15 shows that the ammonia supplied as a reducing agent is supplied from a separate storage tank, it is also possible that the ammonia is supplied from the storage tank 100.

In particular, the exhaust gas (EG) may pass through the high temperature portion 32 of the heat recovery steam generator 30 and may be branched before passing through the first selective catalytic reduction device 50 and be supplied as a heat source for vaporizing the ammonia.

Figure 16:
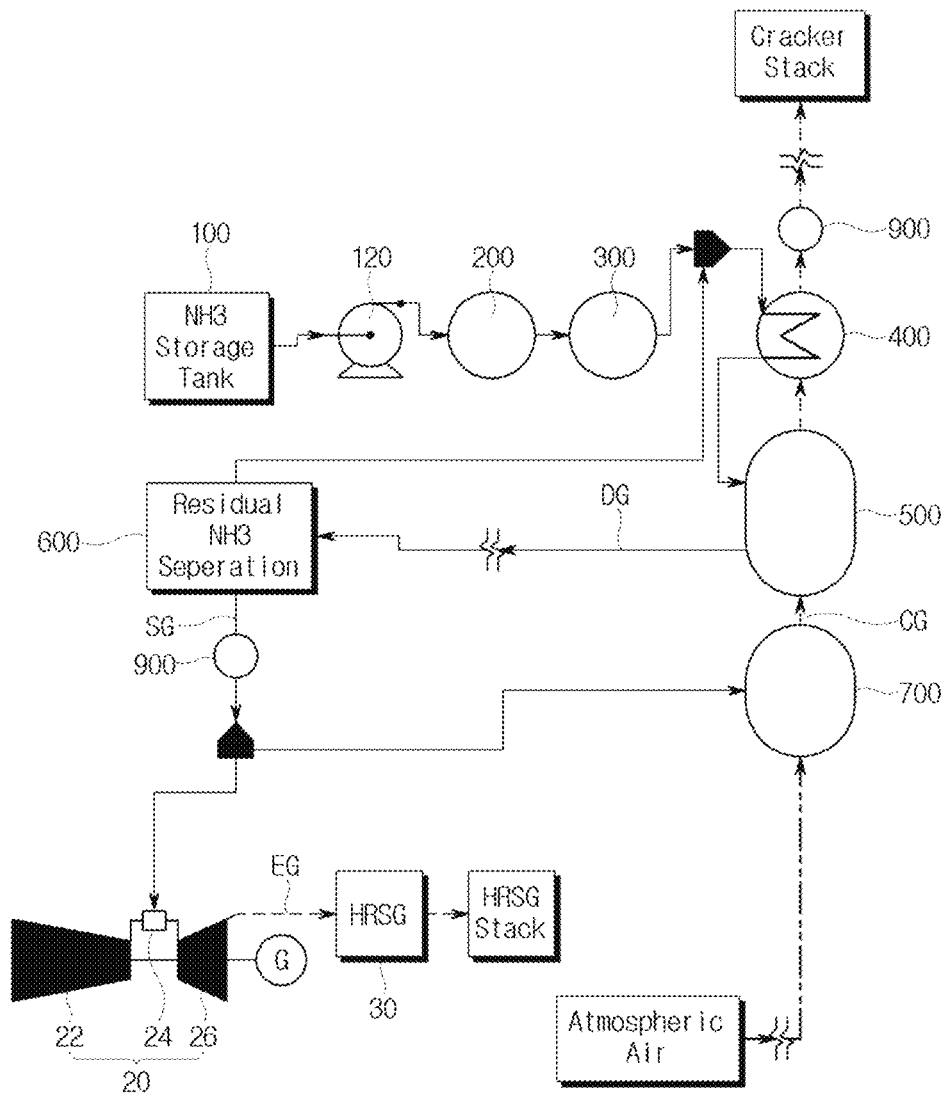
FIG. 16 is a schematic diagram of a gas turbine plant with an ammonia decomposition system according to an embodiment described herein.
Figure 17:
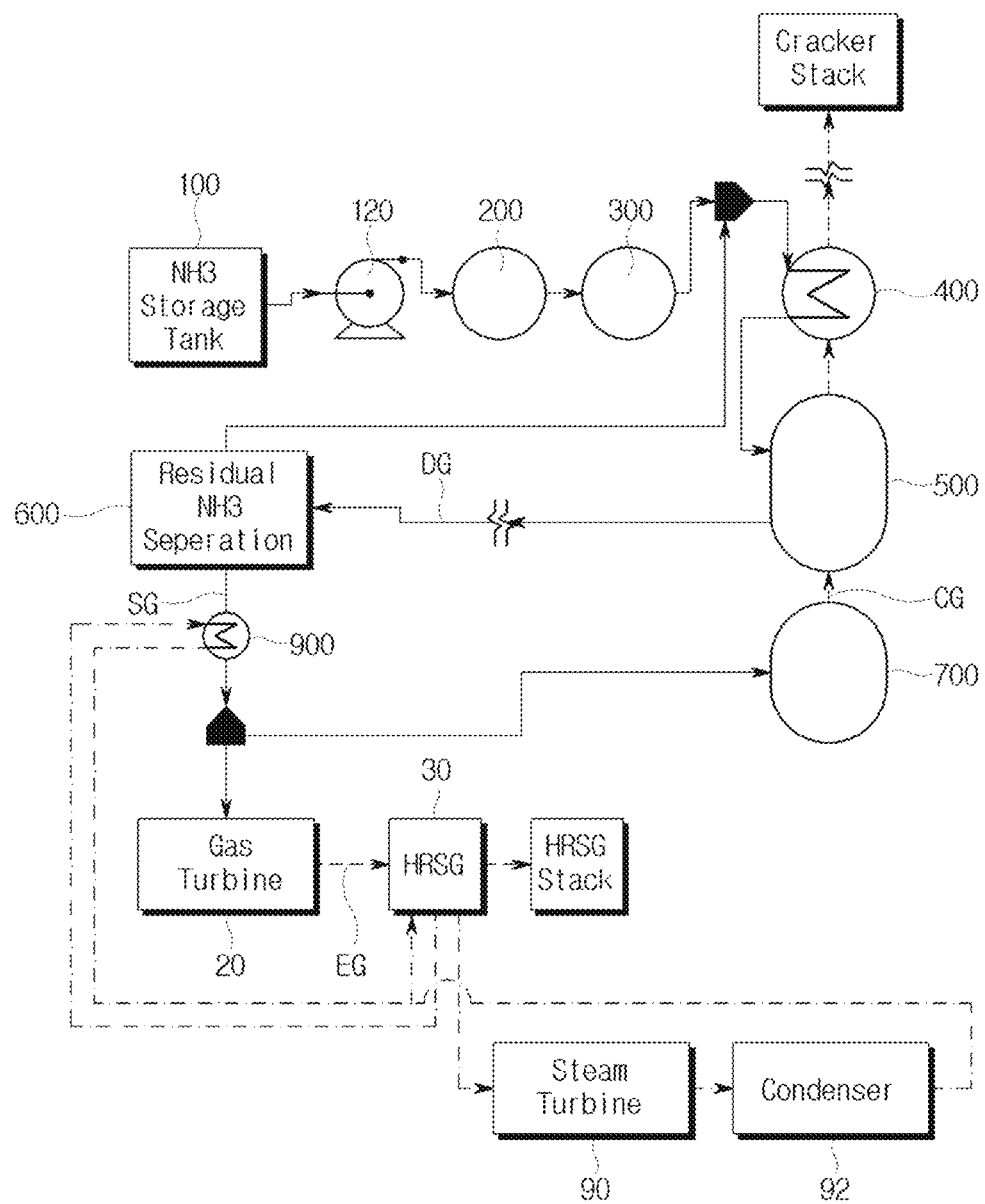
FIG. 17 is a schematic diagram of a gas turbine plant with an ammonia decomposition system according to an embodiment described herein.

Next, according to the embodiment shown in FIGS. 16 and 17, a fuel heater 900 that heats the fuel supplied to the first combustor 700 or the synthesis gas supplied to the second combustor 24 is further included. In FIGS. 16 and 17, as described in FIG. 1, since a portion of the synthesis gas (SG) is supplied to the first combustor 700 and is combusted, the fuel supplied to the first combustor 700 also corresponds to the synthesis gas (SG). In this way, the fuel (synthesis gas) entering the first combustor 700 or the second combustor 24 is heated, so that the amount of fuel used for a target temperature of the combustion gas can be reduced.

In FIG. 16, the combustion gas (CG) is supplied as a heat source to the fuel heater 900. Specifically, the combustion gas (CG) that has passed through the decomposition reactor 500 and the first superheater 400 supplies heat to the fuel by directly exchanging heat with the fuel (synthesis gas) while passing through the fuel heater 900. In FIG. 16, the two fuel heaters 900 disposed on the paths of the synthesis gas (SG) and the combustion gas (CG) are the same components and are shown separately for the simplification of the drawing.

In the embodiment, the fuel heater 900 is located on the path before the synthesis gas (SG) coming out of the separator 600 is branched. However, the fuel heater 900 is not limited to this. A plurality of the fuel heaters may be disposed respectively on the paths where the synthesis gas (SG) from the separator 600 is branched and then supplied to the first combustor 700 and the second combustor 24. Alternatively, it is also possible that the fuel heater is disposed on only one of the paths where the synthesis gas (SG) from the separator 600 is branched and then supplied to the first combustor 700 and the second combustor 24.

Although not shown, depending on the embodiment, the decomposition gas (DG) may be supplied as a heat source to the fuel heater 900.

In FIG. 17, water or steam heated by the heat of the exhaust gas (EG) in the heat recovery steam generator 30 is supplied as a heat source to the fuel heater 900. That is, the water or steam heated in the heat recovery steam generator 30 supplies heat to the fuel by directly exchanging heat with the fuel (synthesis gas) while passing through the fuel heater 900. Apart from the steam generated by the heat of the exhaust gas (EG) in the heat recovery steam generator 30, the water or steam supplied to the fuel heater 900 may be extracted from the middle of the heat recovery steam generator 30. For reference, the steam generated in the heat recovery steam generator 30 is supplied to a steam turbine 90, drives the steam turbine, and then flows into a condenser 92. The steam is condensed by a coolant in the condenser 92, and the condensed water is supplied again to the heat recovery steam generator 30. The water cooled by supplying heat in the fuel heater 900 and the water condensed in the condenser 92 may flow back into the heat recovery steam generator 30 and then may be heated by the heat of the exhaust gas (EG).

Similarly, in the embodiment, the fuel heater 900 is located on the path before the synthesis gas (SG) coming out of the separator 600 is branched. However, the fuel heater 900 is not limited to this.

Figure 18:
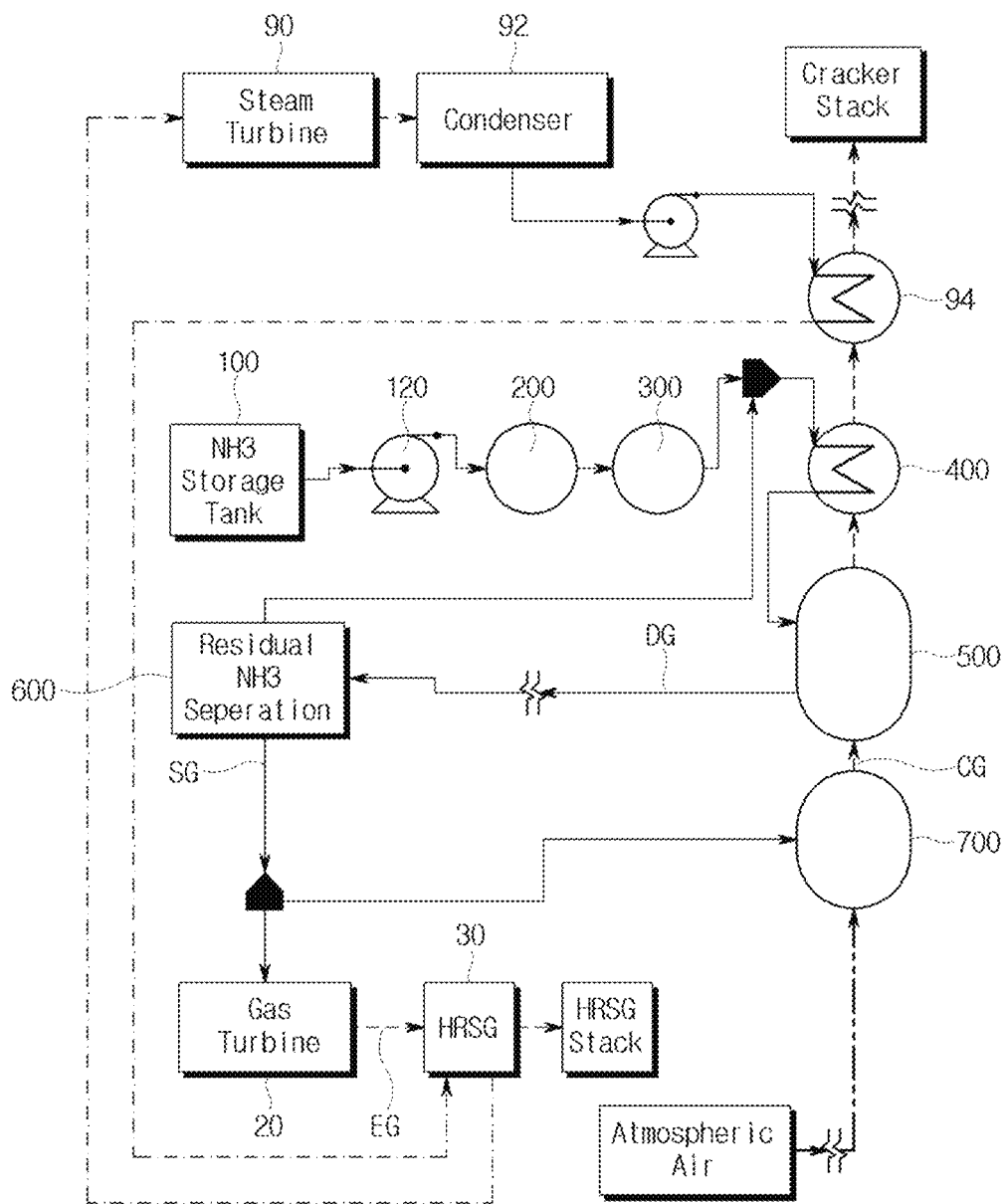
FIG. 18 is a schematic diagram of a gas turbine plant with an ammonia decomposition system according to an embodiment described herein.

Next, according to the embodiment shown in FIG. 18, the steam generated by the heat of the exhaust gas (EG) in the heat recovery steam generator 30 is supplied to the steam turbine 90 and drives the steam turbine and then flows into the condenser 92. Then, the water condensed in the condenser 92 is not directly supplied to the heat recovery steam generator 30, but is supplied to the heat recovery steam generator 30 after exchanging heat with the combustion gas (CG). For this purpose, a third heat exchanger 94 where the water and the combustion gas (CG) exchange heat is provided downstream of the first superheater 400, and the combustion gas (CG) that has passed through the decomposition reactor 500 and the first superheater 400 exchanges heat with the water in the third heat exchanger 94.

According to this, the water condensed in the condenser 92 is heated by the combustion gas (CG) and then is supplied to the heat recovery steam generator 30, so the efficiency can be improved.

Figure 19:
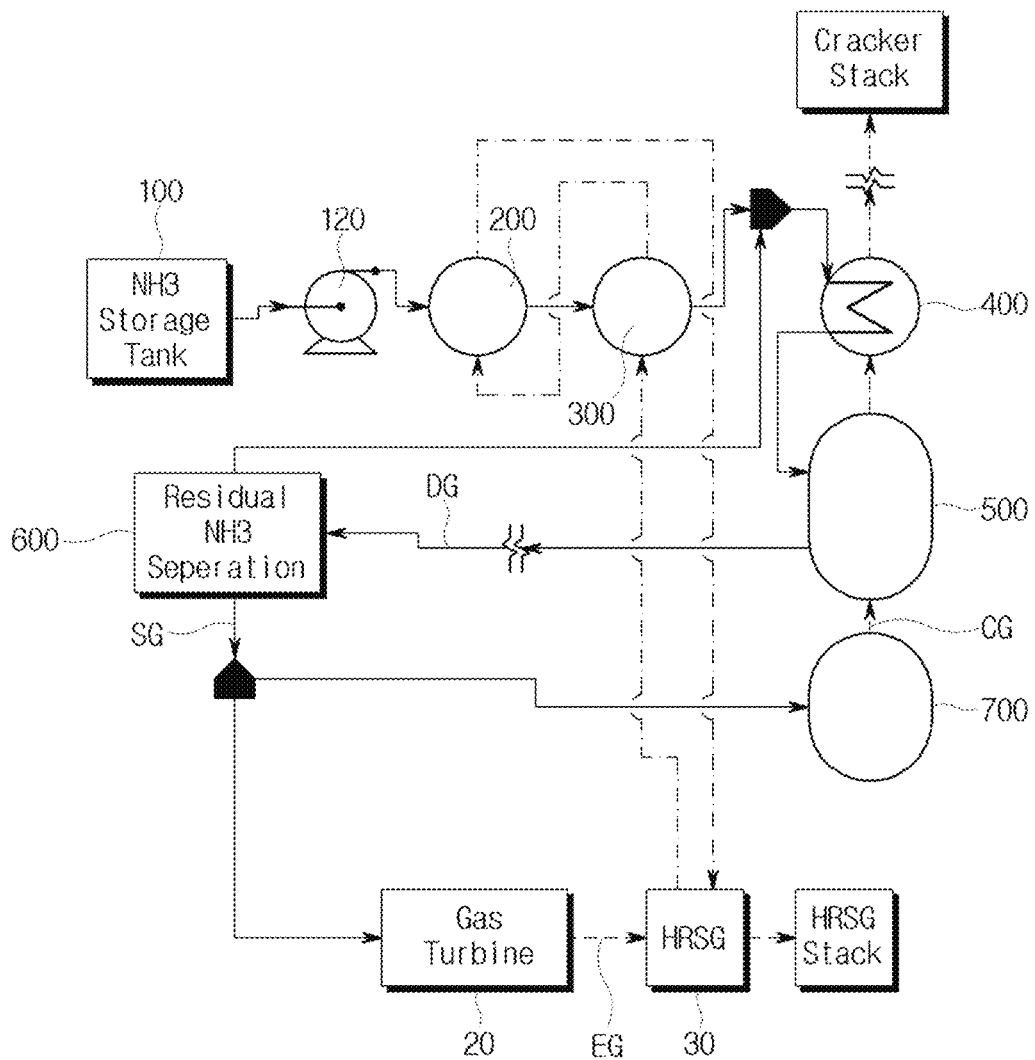
FIG. 19 is a schematic diagram of a gas turbine plant with an ammonia decomposition system according to an embodiment described herein.

Next, according to the embodiment shown in FIG. 19, at least a portion of the water or steam heated by the heat of the exhaust gas (EG) is extracted from the heat recovery steam generator 30 and supplies heat while continuously passing through the vaporizer 300 and the preheater 200, and then returns back to the heat recovery steam generator 30. In particular, the water or steam extracted from the heat recovery steam generator 30 is cooled while passing through the vaporizer 300 and the preheater 200, so that the water or steam may return to a location where the temperature of the water or steam is lower than the temperature of a location where the water or steam is extracted within the heat recovery steam generator 30. In this way, the efficiency of the plant can be increased by using the water or steam heated in the heat recovery steam generator 30 as heat sources of the preheater 200 and the vaporizer 300. Although not all are shown, the water or steam extracted from the heat recovery steam generator 30 may supply heat while passing through one, a combination of two or more, or all three of the preheater 200, the vaporizer 300, and the first superheater 400. When the water or steam extracted from the heat recovery steam generator 30 passes through the first superheater 400, the combustion gas (CG) would not pass through the first superheater 400.

Figure 20:
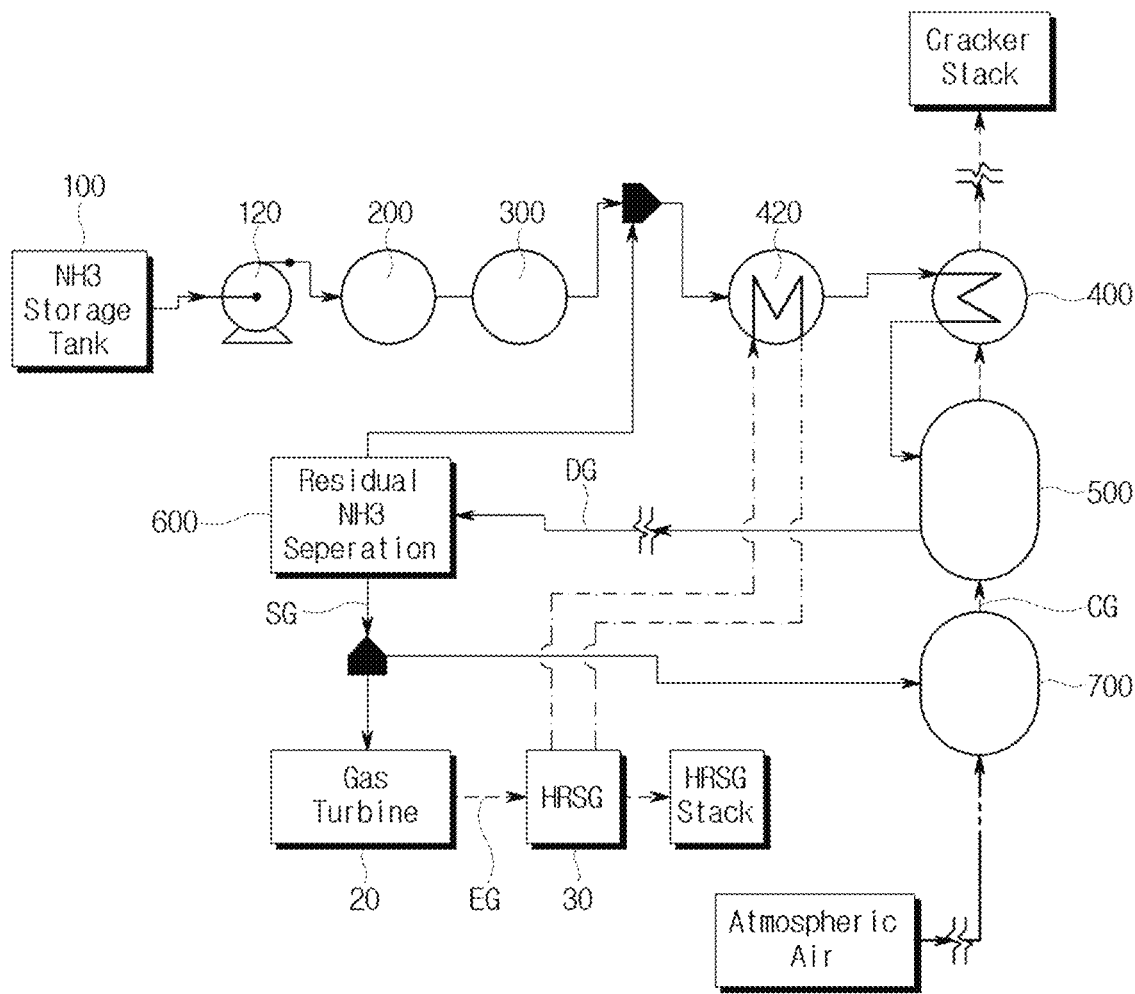
FIG. 20 is a schematic diagram of a gas turbine plant with an ammonia decomposition system according to an embodiment described herein.

According to the embodiment shown in FIG. 20, the second superheater 420 described in FIG. 7 is further included, and at least a portion of the water or steam heated by the heat of the exhaust gas (EG) is extracted from the heat recovery steam generator 30 and supplies heat while passing through the second superheater 420, and then returns back to the heat recovery steam generator 30. In particular, the water or steam extracted from the heat recovery steam generator 30 is cooled while passing through the second superheater 420, so that the water or steam may return to a location where the temperature of the water or steam is lower than the temperature of a location where the water or steam is extracted within the heat recovery steam generator 30. In this way, the efficiency of the plant can be increased by using the water or steam heated in the heat recovery steam generator 30 as heat sources of the second superheater 420.

Figure 21:
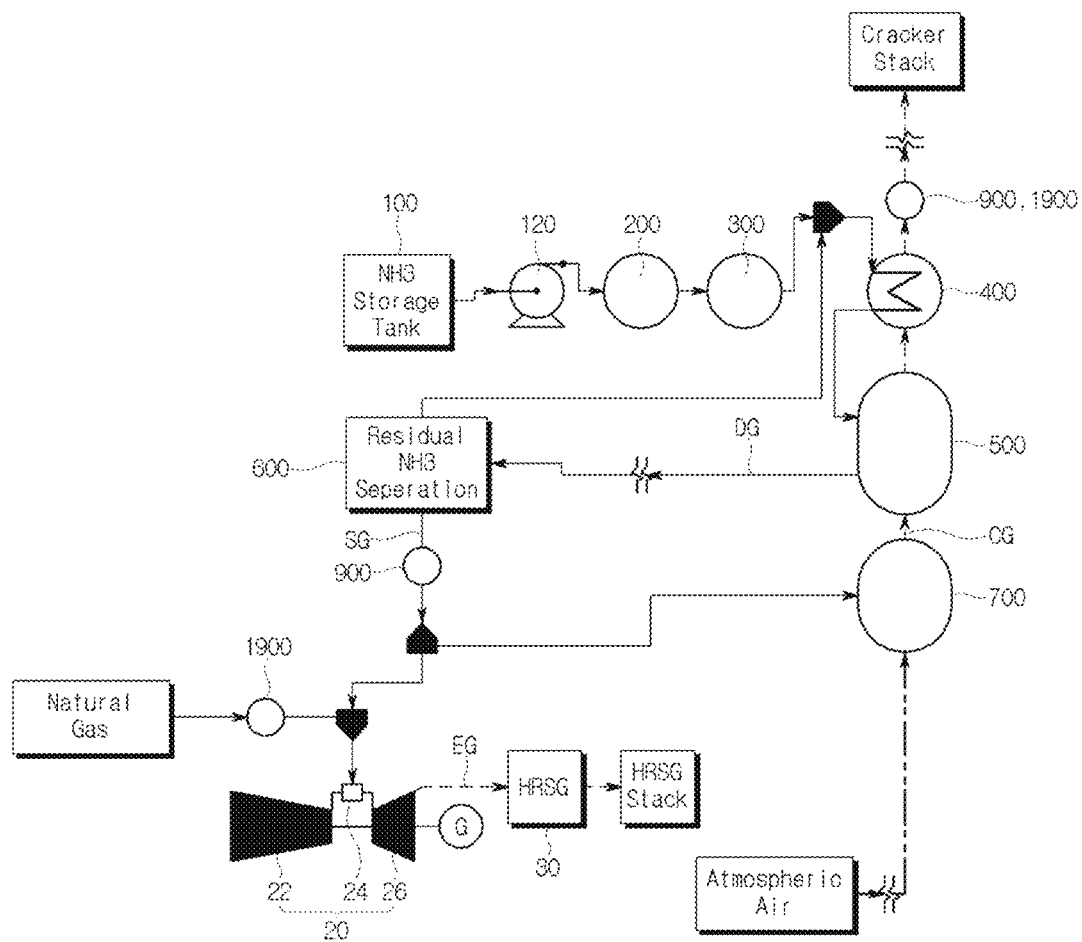
FIG. 21 is a schematic diagram of a gas turbine plant with an ammonia decomposition system according to an embodiment described herein.

Next, according to the embodiment shown in FIG. 21, the synthesis gas and natural gas (NG) can be supplied to the second combustor 24 together and mixed and combusted.

In the embodiment, in addition to the fuel heater 900 described in FIGS. 16 and 17, a natural gas heater 1900 that heats the natural gas supplied to the second combustor 24 is further included. As described above, the heat sources of the fuel heater 900 and the natural gas heater 1900 may be the combustion gas (CG), the decomposition gas (DG), or water or steam heated in the heat recovery steam generator 30.

As shown in the drawing, the natural gas (NG) may be heated by the natural gas heater 1900. Then, the natural gas (NG) may meet the synthesis gas (SG) heated in the fuel heater 900 and may enter the second combustor 24. In particular, it is preferable that the temperature of the synthesis gas (SG) heated in the fuel heater 900 should be lower than the temperature of the natural gas (NG) heated in the natural gas heater 1900. According to this, it is economical because it is not necessary to apply high-quality materials due to the increase in the temperature of hydrogen.

In the embodiment, although the description is made based on the fact that both the fuel heater 900 and the natural gas heater 1900 are included, it is not limited thereto. That is, the fuel heater 900 may be omitted and only the natural gas heater 1900 may be included.

Finally, a gas turbine plant according to FIG. 22 will be described.

Figure 22:
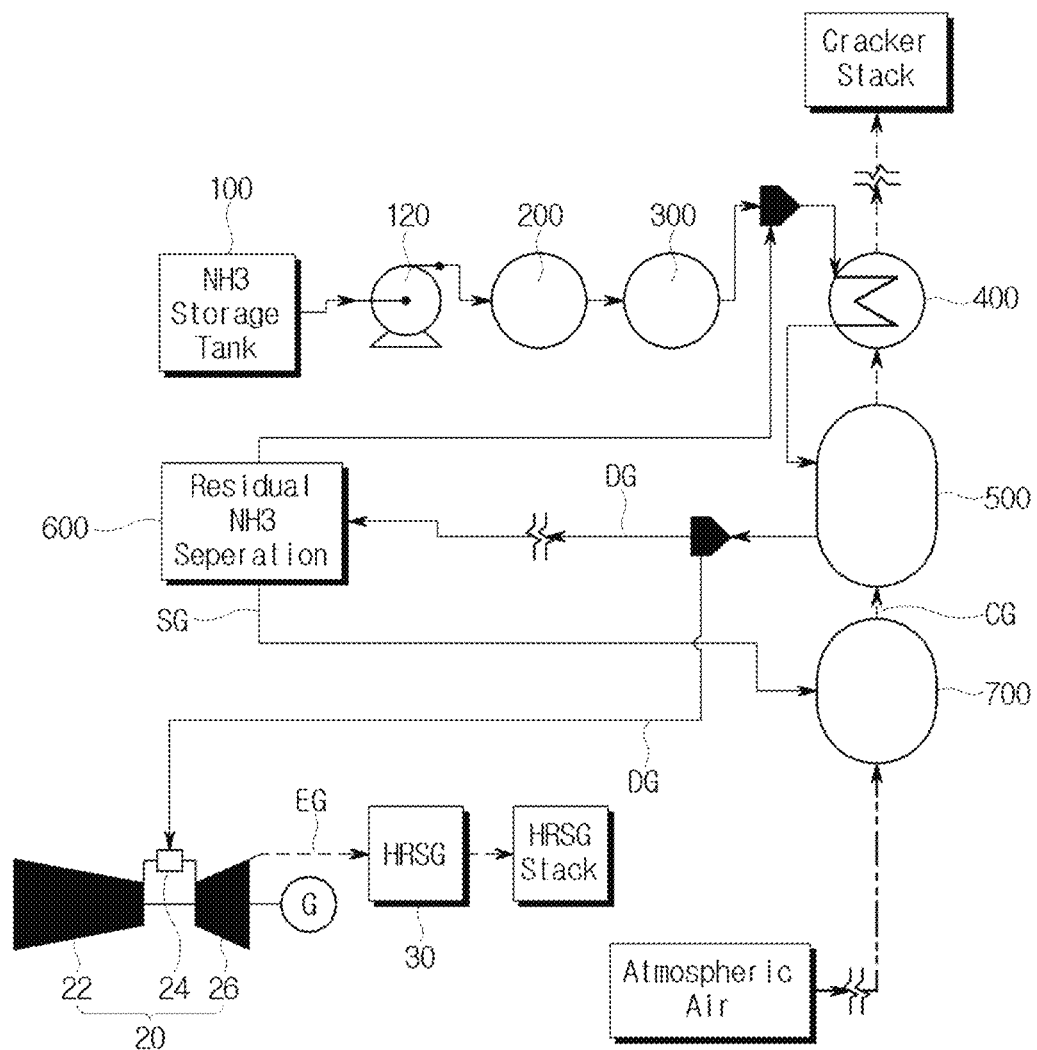
FIG. 22 is a schematic diagram of a gas turbine plant with an ammonia decomposition system according to an embodiment described herein.

The gas turbine plant in FIG. 22 includes the ammonia decomposition system 10, the gas turbine 20, and the heat recovery steam generator 30 in the same manner as the gas turbine plant in FIG. 1. Also, the ammonia decomposition system 10 also includes the storage tank 100, the supply pump 120, the preheater 200, the vaporizer 300, the first superheater 400, the decomposition reactor 500, the separator 600, and the first combustor 700 in the same manner as described above.

However, a portion of the decomposition gas (DG) decomposed in the decomposition reactor 500 instead of the synthesis gas (SG) coming out of the separator 600 is supplied to the second combustor 24 of the gas turbine. The residual ammonia is removed by the separator 600 and then the synthesis gas (SG) consisting of hydrogen and nitrogen is supplied to the first combustor 700 and combusted.

Here, similarly, the combustion gas (CG) generated in the first combustor 700 may supply heat while passing through the decomposition reactor 500 and the first superheater 400.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

REFERENCE NUMERALS

10: Ammonia Decomposition System
20: Gas Turbine
22: Compressor
24: Second Combustor
26: Turbine
30: Heat Recovery Steam Generator
32: High Temperature Portion
34: Low Temperature Portion
40: Heat Transfer Fluid Circuit
42: Storage Tank
44: Pump
45: Additional Pump
46: First Heat Exchanger
48: Second Heat Exchanger
50: First Selective Catalytic Reduction Device
60: Second Selective Catalytic Reduction Device
70, 80: Mixer
90: Steam Turbine
92: Condenser
94: Third Heat Exchanger
100: Storage Tank
120: Supply Pump
130: Additional Supply Pump
200: Preheater
300: Vaporizer
400: First Superheater
420: Second Superheater
500: Decomposition Reactor
600: Separator
700: First Combustor
720, 1720, 2720: Gas Expander
800, 1800: Gas Compressor
1820: Cooler
900: Fuel Heater
1900: Natural Gas Heater
CG: Combustion Gas
EG: Exhaust Gas
DG: Decomposition Gas
SG: Synthesis Gas

What is claimed is:

1. A gas turbine plant with an ammonia decomposition system, the gas turbine plant comprising:
   a storage tank configured to store liquid ammonia;
   a supply pump configured to supply the liquid ammonia of the storage tank;
   a preheater configured to preheat the liquid ammonia supplied by the supply pump;
   a vaporizer configured to vaporize the liquid ammonia preheated by the preheater;

a first superheater configured to superheat gaseous ammonia vaporized by the vaporizer;
a decomposition reactor configured to thermally decompose the gaseous ammonia superheated by the first superheater;
a separator configured to separate residual ammonia from the decomposition gas decomposed by the decomposition reactor; and
a first combustor configured to generate combustion gas in such a way as to supply heat to the decomposition reactor,
wherein synthesis gas consisting of hydrogen and nitrogen with the residual ammonia removed by the separator is supplied to a second combustor of a gas turbine,
wherein exhaust gas discharged from the gas turbine is supplied to a heat recovery steam generator,
wherein the first combustor is placed outside the heat recovery steam generator, and
wherein the combustion gas supplies heat while passing directly through the decomposition reactor and the first superheater.

2. The gas turbine plant with the ammonia decomposition system of claim 1, wherein the residual ammonia separated by the separator is mixed with the gaseous ammonia vaporized by the vaporizer and is supplied to the first superheater.

3. The gas turbine plant with the ammonia decomposition system of claim 1, wherein a portion of the decomposition gas decomposed by the decomposition reactor, a portion of the synthesis gas from which residual ammonia has been removed in the separator, a portion of the liquid ammonia preheated in the preheater, or a portion of the gaseous ammonia superheated by the first superheater is supplied to the first combustor and combusted.

4. The gas turbine plant with the ammonia decomposition system of claim 1, wherein a portion of exhaust gas discharged from the gas turbine is supplied to the first combustor.

5. The gas turbine plant with the ammonia decomposition system of claim 1, wherein the decomposition gas is supplied to the separator after supplying heat through at least one of the preheater, the vaporizer, and the first superheater from the decomposition reactor.

6. The gas turbine plant with the ammonia decomposition system of claim 1, further comprising a second superheater that pre-superheats the gaseous ammonia before the gaseous ammonia vaporized in the vaporizer is supplied to the first superheater,
wherein the decomposition gas is supplied to the separator after supplying heat through the second superheater from the decomposition reactor.

7. The gas turbine plant with the ammonia decomposition system of claim 1, further comprising a gas compressor that compresses the decomposition gas or the synthesis gas.

8. The gas turbine plant with the ammonia decomposition system of claim 1,
wherein the combustion gas that has passed through the decomposition reactor and the first superheater is supplied together with the exhaust gas to the heat recovery steam generator.

9. The gas turbine plant with the ammonia decomposition system of claim 1, wherein air supplied to a compressor of the gas turbine supplies heat while passing through the preheater before being supplied to the compressor.

10. The gas turbine plant with the ammonia decomposition system of claim 1, wherein a heat transfer fluid absorbs heat from air supplied to a compressor of the gas turbine and supplies the heat to the liquid ammonia in the preheater.

11. The gas turbine plant with the ammonia decomposition system of claim 1,
wherein the exhaust gas discharged from the gas turbine or the combustion gas generated in the first combustor passes through a selective catalytic reduction device, and
wherein at least one of a portion of the gaseous ammonia vaporized by the vaporizer and a portion of the gaseous ammonia superheated by the first superheater is supplied as a reducing agent to the selective catalytic reduction device.

12. The gas turbine plant with the ammonia decomposition system of claim 10,
wherein the exhaust gas discharged from the gas turbine or the combustion gas generated in the first combustor passes through a selective catalytic reduction device,
wherein the heat transfer fluid supplies heat to the ammonia which is supplied as a reducing agent from the storage tank to the selective catalytic reduction device, and
wherein the gaseous ammonia vaporized by being supplied with heat by the heat transfer fluid is supplied together with a portion of the gaseous ammonia superheated by the first superheater to the selective catalytic reduction device.

13. The gas turbine plant with the ammonia decomposition system of claim 1,
wherein the exhaust gas discharged from the gas turbine or the combustion gas generated in the first combustor passes through a selective catalytic reduction device, and
wherein a portion of the exhaust gas or a portion of the combustion gas is branched before flowing into the selective catalytic reduction device, and supplies heat the ammonia supplied as a reducing agent to the selective catalytic reduction device.

14. The gas turbine plant with the ammonia decomposition system of claim 1, further comprising a fuel heater that heats the fuel supplied to the first combustor or the synthesis gas supplied to the second combustor,
and
wherein the combustion gas or water or steam heated by heat of the exhaust gas in the heat recovery steam generator is supplied as a heat source to the fuel heater.

15. The gas turbine plant with the ammonia decomposition system of claim 1,
and
wherein steam generated by heat of the exhaust gas in the heat recovery steam generator is supplied to a steam turbine, drives the steam turbine, and then flows into a condenser, and water condensed in the condenser exchanges heat with the combustion gas, and then is supplied back to the heat recovery steam generator.

16. The gas turbine plant with the ammonia decomposition system of claim 1,
and
wherein water or steam heated by heat of the exhaust gas in the heat recovery steam generator supplies heat while passing through at least one of the preheater, the vaporizer, and the first superheater, and then returns back to the heat recovery steam generator.

17. The gas turbine plant with the ammonia decomposition system of claim 1, further comprising a second superheater that pre-superheats the gaseous ammonia before the gaseous ammonia vaporized in the vaporizer is supplied to the first superheater,
and wherein water or steam heated by heat of the exhaust gas in the heat recovery steam generator supplies heat while passing through the second superheater, and then returns back to the heat recovery steam generator.

18. The gas turbine plant with the ammonia decomposition system of claim 1,
wherein natural gas is further supplied to the second combustor,
wherein the gas turbine plant further comprises:
a natural gas heater that heats the natural gas supplied to the second combustor; and
a fuel heater that heats the synthesis gas supplied to the second combustor, and
wherein a temperature of the synthesis gas heated in the fuel heater is lower than a temperature of the natural gas heated in the natural gas heater.

19. A gas turbine plant with an ammonia decomposition system, the gas turbine plant comprising:
a storage tank configured to store liquid ammonia;
a supply pump configured to supply the liquid ammonia of the storage tank;
a preheater configured to preheat the liquid ammonia supplied by the supply pump;
a vaporizer configured to vaporize the liquid ammonia preheated by the preheater;
a first superheater configured to superheat gaseous ammonia vaporized by the vaporizer;
a decomposition reactor configured to thermally decompose the gaseous ammonia superheated by the first superheater;
a separator configured to separate residual ammonia from the decomposition gas decomposed by the decomposition reactor; and
a first combustor configured to generate combustion gas in such a way as to supply heat to the decomposition reactor,
wherein a portion of the decomposition gas decomposed in the decomposition reactor is supplied to a second combustor of a gas turbine, and
wherein synthesis gas consisting of hydrogen and nitrogen with the residual ammonia removed by the separator is supplied to the first combustor and combusted,
wherein exhaust gas discharged from the gas turbine is supplied to a heat recovery steam generator,
wherein the first combustor is placed outside the heat recovery steam generator, and
wherein the combustion gas supplies heat while passing directly through the decomposition reactor and the first superheater.

* * * * *